United States Patent
Deshpande

(10) Patent No.: US 9,860,538 B2
(45) Date of Patent: *Jan. 2, 2018

(54) ELECTRONIC DEVICE FOR ENCODING A BUFFER PARAMETER

(71) Applicant: Sharp Kabushiki Kaisha, Sakai, Osaka (JP)

(72) Inventor: Sachin G. Deshpande, Camas, WA (US)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,340

(22) Filed: Nov. 8, 2016

(65) Prior Publication Data

US 2017/0054986 A1 Feb. 23, 2017

Related U.S. Application Data

(63) Continuation of application No. 15/087,143, filed on Mar. 31, 2016, now Pat. No. 9,532,063, which is a (Continued)

(51) Int. Cl.
| | |
|---|---|
| *G06K 9/46* | (2006.01) |
| *H04N 19/152* | (2014.01) |
| *H04N 19/70* | (2014.01) |
| *H04N 19/17* | (2014.01) |
| *H04N 19/44* | (2014.01) |

(Continued)

(52) U.S. Cl.
CPC .......... *H04N 19/152* (2014.11); *H04N 19/17* (2014.11); *H04N 19/423* (2014.11); *H04N 19/44* (2014.11); *H04N 19/46* (2014.11); *H04N 19/70* (2014.11)

(58) Field of Classification Search
CPC ....... H04N 19/00533; H04N 19/00545; H04N 19/00884; H04N 19/00006
See application file for complete search history.

(56) References Cited

U.S. PATENT DOCUMENTS

| | | |
|---|---|---|
| 6,181,824 B1 | 1/2001 | Takizawa et al. |
| 8,774,266 B2 | 7/2014 | Wang et al. |

(Continued)

FOREIGN PATENT DOCUMENTS

JP 2010-232720 A 10/2010

OTHER PUBLICATIONS

B. Bross, W-J Han, J-R Ohm, G.J. Sullivan and T. Wiegand, "High efficiency video coding (HEVC) text specification draft 6", JCTVC-HI003, Nov. 21-30, 2011, Geneva, CH.

(Continued)

*Primary Examiner* — Ali Bayat
(74) *Attorney, Agent, or Firm* — Birch, Stewart, Kolasch & Birch, LLP

(57) ABSTRACT

An electronic device for sending a message is described. The electronic device includes a processor and instructions stored in memory that is in electronic communication with the processor. The electronic device determines whether a picture is allowed to be decoded on a sub-picture level. If the picture is allowed to be decoded on a sub-picture level, the electronic device generates at least one of a buffer size parameter and a buffer scale parameter. The electronic device sends at least one of the buffer size parameter and the buffer scale parameter.

3 Claims, 11 Drawing Sheets

Related U.S. Application Data continuation of application No. 14/945,158, filed on Nov. 18, 2015, now Pat. No. 9,332,268, which is a continuation of application No. 14/626,614, filed on Feb. 19, 2015, now Pat. No. 9,219,919, which is a continuation of application No. 13/631,720, filed on Sep. 28, 2012, now Pat. No. 8,989,508.

(51) Int. Cl.
*H04N 19/423* (2014.01)
*H04N 19/46* (2014.01)

(56) References Cited

U.S. PATENT DOCUMENTS

| | | | |
|---|---|---|---|
| 9,332,268 B2 | 5/2016 | Deshpande | |
| 2010/0246662 A1 | 9/2010 | Koto et al. | |
| 2013/0266075 A1* | 10/2013 | Wang | H04N 19/70 375/240.25 |
| 2013/0266076 A1 | 10/2013 | Wang | |
| 2014/0003487 A1* | 1/2014 | Hague | H04N 19/70 375/240.02 |
| 2014/0016708 A1 | 1/2014 | Wang | |
| 2015/0208095 A1* | 7/2015 | Schierl | H04N 19/70 375/240.28 |

OTHER PUBLICATIONS

B. Bross, W-J Han, J-R Ohm, G.J. Sullivan and T. Wiegand, "High efficiency video coding (HEVC) text specification draft 8," JCTVC-J1003, Stockholm, Jul. 2012.

International Search Report issued for International Application No. PCT/JP2013/005586 dated Dec. 17, 2013.

Japanese Office Action, dated Aug. 18, 2015, in related application No. JP2015-515328.

K. Kazui, J. Koyama, S. Shimada, A. Nakagawa, AHG11: Proposed text for sub-picture based CPB operation (JCTVC-I0333) 9th JCT-TVC Meeting.

K. Kazui, J. Koyama, S. Shimada, A. Nakagawa, AHG11: Proposed text for sub-picture based CPB operation, Fujitsu Laboratories, Ltd. Apr. 27-May 7, 2012, Geneva, CH.

K. Kazui, J. Koyama, S. Shimada, A. Nakagawa, Sub-picture based CPB Operation, Apr. 27-May 7, 2012, 9th Meeting, Geneva, CH.

K. Kazui, J. Koyama, S. Shimada, A.. Nakagawa, Sub-picture based CPB Operation, Attachment, Apr. 27-May 7, 2012, 9th Meeting, Geneva, CH JCTVC-I0588.

Kimihiko Kazui et al., "AHG9: Improvement of HRD for Sub-Picture Based Operation," Joint Collaborative Team on Video Coding (JCT-VC) of ITU-T SG16 WP3 and ISO/IEC JTC1/SC29/WG11 JCTVC-J0136, ITU-T, Jul. 2012.

Notice of Allowance dated Nov. 21, 2014 for U.S. Appl. No. 13/631,720.

Office Action dated Apr. 3, 2014 for U.S. Appl. No. 13/631,720.

Sachin Deshpanda et al., "On Sub-Picture Based HRD Buffering", Joint Collaborative Team on Video Coding (JCT-VC) of ITU-T SG16 WP3 and ISO/IEC JTC1/SC29/WG11 JCTVC-K0221, ITU-T, Oct. 2012.

Sachin Deshpanda et al., "On Sub-Picture Based CPB," Joint Collaborative Team on Video Coding (JCT-VC) of ITU-T SG16 WP3 and ISO/IEC JTC1/SC29/WG11 JCTVC-J0306, ITU-T, Jul. 2012.

Y. Wang, Y. Chen, Sub-picture-level low-delay CPB behavior, Apr. 27-May 1, 2012, 9th Meeting, Geneva, CH.

Notice of Allowance dated Aug. 20, 2015 for U.S. Appl. No. 14/626,614.

Notice of Allowance, dated Sep. 12, 2016, in U.S. Appl. No. 15/087,143.

Office Action dated Apr. 3, 2015 for U.S. Appl. No. 14/626, 614.

Office Action, dated May 26, 2016, in U.S. Appl. No. 15/087,143.

* cited by examiner

ELECTRONIC DEVICE FOR ENCODING A BUFFER PARAMETER

CROSS REFERENCE

This application is a Continuation of co-pending U.S. application Ser. No. 15/087,143, filed Mar. 31, 2016, which is a Continuation of U.S. application Ser. No. 14/945,158, filed Nov. 18, 2015, issued as U.S. Pat. No. 9,332,268 on May 3, 2016, which is a Continuation of U.S. application Ser. No. 14/626,614, filed Feb. 19, 2015, issued as U.S. Pat. No. 9,219,919 on Dec. 22, 2015, which is a Continuation of U.S. application Ser. No. 13/631,720, filed on Sep. 28, 2012, issued as U.S. Pat. No. 8,989,508 on Mar. 24, 2015, the entire contents of which are hereby incorporated by reference and for which priority is claimed under 35 U.S.C. §120.

TECHNICAL FIELD

The present disclosure relates generally to electronic devices. More specifically, the present disclosure relates to electronic devices for signaling a sub-picture parameter.

BACKGROUND

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

The increasing popularity of digital media has presented several problems. For example, efficiently representing high-quality digital media for storage, transmittal and rapid playback presents several challenges. As can be observed from this discussion, systems and methods that represent digital media efficiently with improved performance may be beneficial.

DETAILED DESCRIPTION

Figure 1:
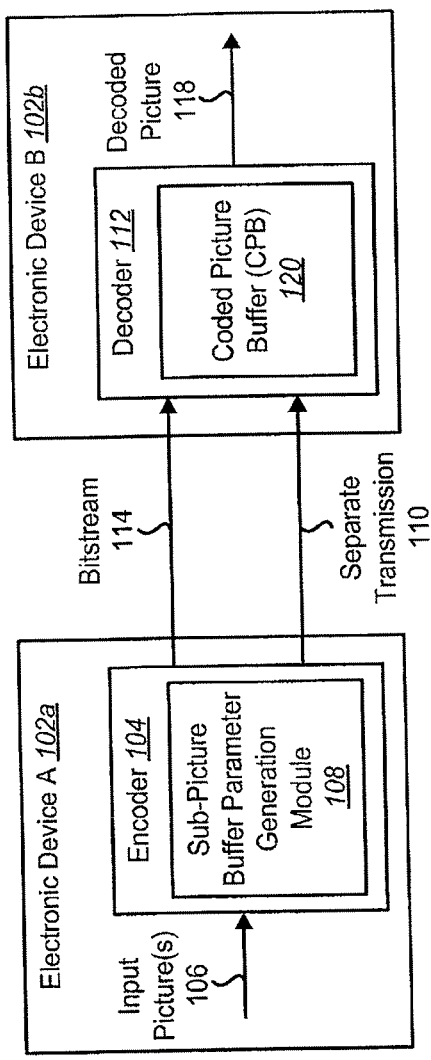
FIG. 1 is a block diagram illustrating an example of one or more electronic devices in which systems and methods for signaling a sub-picture buffer parameter may be implemented.

An electronic device for sending a message is described. The electronic device includes a processor and instructions stored in memory that is in electronic communication with the processor. The electronic device determines whether a picture is allowed to be decoded on a sub-picture level. If the picture is allowed to be decoded on a sub-picture level, the electronic device generates at least one of a buffer size parameter and a buffer scale parameter. The electronic device sends at least one of the buffer size parameter and the buffer scale parameter.

The buffer scale parameter may be a sub-picture coded picture buffer (CPB) size scale parameter. The sub-picture CPB size scale parameter may be du_cpb_size_scale.

The buffer size parameter may be a sub-picture CPB size value parameter. The sub-picture CPB size value parameter may be du_cpb_size_value_minus1[SchedSelIdx]. SchedSelIdx may be an index variable.

The buffer scale parameter may be a sub-picture CPB size scale parameter. The sub-picture CPB size scale parameter may be du_cpb_size_scale.

If the picture is allowed to be decoded on a sub-picture level, the electronic device may generate a sub-picture CPB present parameter and send the sub-picture CPB present parameter. The sub-picture CPB present parameter may be a sub-picture CPB parameter present flag. The sub-picture CPB parameter present flag may be sub_pic_cpb_params_present_flag.

If the picture is allowed to be decoded on a sub-picture level, the electronic device may perform a bitstream conformance test on the sub-picture level. An encoder may not violate the sent buffer size parameter and/or the sent buffer scale parameter.

An electronic device for testing a bitstream is also described. The electronic device includes a processor and instructions stored in memory that is in electronic communication with the processor. The electronic device receives data. The electronic device also obtains a sub-picture level coded picture buffer (CPB) parameter. The electronic device performs a sub-picture level CPB operation based on the sub-picture level CPB parameter.

Performing a sub-picture level CPB operation based on the sub-picture level CPB parameter may include performing an interpolated delivery schedule test for sub-picture level CPB operation based on the sub-picture level CPB parameter. Performing a sub-picture level CPB operation based on the sub-picture level CPB parameter may be based the specification of a hypothetical reference decoder (HRD) operation.

Obtaining the sub-picture level CPB parameter may include obtaining a sub-picture CPB size scale parameter. The sub-picture CPB size scale parameter may be du_cpb_size_scale.

A method for sending a buffer parameter is also described. It may be determined whether a picture is allowed to be decoded on a sub-picture level. If the picture is be allowed to be decoded on a sub-picture level, a buffer size parameter and/or a buffer scale parameter is generated. The buffer size parameter and/or a buffer scale parameter is sent.

The systems and methods disclosed herein describe electronic devices for signaling a buffer parameter. For example, the systems and methods disclosed herein describe signaling a sub-picture buffer parameter by sending one or more sub-picture buffer parameters, such as a sub-picture coded picture buffer (CPB) parameter. In some configurations, the systems and methods disclosed herein may describe sending one or more sub-picture buffer parameters to a Hypothetical Reference Decoder (HRD). For example, this may be done in addition to sending one or more corresponding picture buffer parameters to a HRD.

In some configurations, the systems and methods disclosed herein may define new syntax elements and semantics to signal a buffer size and/or a buffer scale parameter. These parameters may be calculated using the leaky bucket model of operation of HRD at the sub-picture level. Bitstream conformance restrictions may also be defined based on the sub-picture buffer parameters.

The systems and methods disclosed herein (e.g., the HRD modification) may perform operations, such as testing or verifying bitstream conformance based on the one or more sub-picture buffer parameters. For instance, the systems and methods disclosed herein describe modification to HRD parameters to allow for CPB operation on a sub-picture level. Additionally, CPB operations on the picture level or access unit level may be simultaneously supported.

In some configurations, the systems and methods disclosed herein may describe a decoder conformance constraint for interpolated delivery schedules. For example, the decoder conformance constraint may be based on the sub-picture buffer parameters, which may be sent to the decoder.

The systems and methods disclosed herein (e.g., the HRD modification) may provide a benefit of reducing buffer size, such as the CPB, when the HRD is operating at the sub-picture level. This may result in reducing hardware costs. For example, a smaller buffer size requires less memory, which results in less hardware memory being required.

In addition, the systems and methods disclosed herein may provide a benefit that the HRD will not overflow or underflow. For example, one way this may be accomplished is through the signaling of buffer size and/or buffer scale parameters for sub-picture based CPB operation and through checking the bitstream for conformance.

It should be noted that although the term "hypothetical" is used in reference to an HRD, the HRD may be physically implemented. For example, "HRD" may describe an implementation of an actual decoder. In some configurations, an HRD may be implemented in order to determine whether a bitstream conforms to High Efficiency Video Coding (HEVC) specifications. For instance, an HRD may determine whether Type I bitstreams and Type II bitstreams conform to HEVC specifications. A Type I bitstream may include only Video Coding Layer (VCL) Network Access Layer (NAL) units and filler data NAL units. A Type II bitstream may include additional other NAL units and syntax elements.

In some known configurations, such as in Benjamin Bros et al., "High efficiency video coding (HEVC) text specification draft 8," JCTVC-J1003_d7, Stockholm, July 2012 (hereinafter "HEVC Draft 8"), the sub-picture based HRD model and related syntax and semantics are described. The systems and methods disclosed herein may describe modifications to the syntax and semantics presented in HEVC Draft 8.

Examples regarding the operation of a CPB in accordance with the systems and methods disclosed herein are given as follows. The specifications given as follows may apply independently to each set of CPB parameters that is present and to both Type I and Type II conformance in accordance with HEVC specifications.

The timing of bitstream arrival (e.g., one or more bitstream arrival times) may be determined as follows. The HRD may be initialized at any one of the buffering period Supplemental Enhancement Information (SEI) messages. Prior to initialization, the CPB may be empty. It should be noted that after initialization, the HRD may not be initialized again by subsequent buffering period SEI messages. In some configurations, the operation of the CPB may independently apply to each set of CPB parameters that is present and to both the Type I and Type II conformance points.

Each access unit may be referred to as access unit n, where the number n identifies the particular access unit. The access unit that is associated with the buffering period SEI message that initializes the CPB may be referred to as access unit 0. All other access units may be referred to as access unit n, with n being incremented by 1 for the next access unit in decoding order.

Each decoding unit may be referred to as decoding unit m, where the number m identifies the particular decoding unit. The first decoding unit in decoding order in access unit 0 is referred to as decoding unit 0. The value of m is incremented by 1 for each subsequent decoding unit in decoding order.

The variables InitCpbRemovalDelay[SchedSelIdx] and InitCpbRemovalDelayOffset[SchedSelIdx] may be set as follows. If either of the following conditions is true, InitCpbRemovalDelay[SchedSelIdx] and InitCpbRemovalDelayOffset[SchedSelIdx] are set to the values of the corresponding initial alt cpb_removal_delay[SchedSelIdx] and initial alt cpb_removal_delay_offset[SchedSelIdx], respectively, of the associated buffering period SEI message, then access unit 0 may be a BLA access unit for which the coded picture has nal_unit_type equal to BLA_W_DLP or BLA_N_LP, and the value of rap_cpb_params_present_flag of the associated buffering period SEI message is equal to 1. Also, if true, SubPicCpbFlag may equal to 1. Otherwise, InitCpbRemovalDelay[SchedSelIdx] and InitCpbRemovalDelayOffset[SchedSelIdx] may be set to the values of the corresponding initial_cpb_removal_delay[SchedSelIdx] and initial_cpb_removal_delay_offset[SchedSelIdx], respectively, of the associated buffering period SEI message.

The time at which the first bit of decoding unit m begins to enter the CPB is referred to as the initial arrival time $t_{ai}(m)$. The initial arrival time of decoding units may be derived as follows. If the decoding unit is decoding unit 0, $t_{ai}(0)=0$. Otherwise (the decoding unit is decoding unit m with m>0), if cbr_flag[SchedSelIdx] is equal to 1, the initial arrival time for decoding unit m, may be equal to the final arrival time (derived below) of decoding unit m−1.

In other words, $t_{ai}(m)=t_{af}(m-1)$. Otherwise (cbr_flag[SchedSelIdx] may be equal to 0), the initial arrival time for decoding unit m is derived by $t_{ai}(m)=\text{Max}(t_{af}(m-1), t_{ai,earliest}(m))$, where $t_{ai,earliest}(m)$ is derived as follows. If decoding unit m is not the first decoding unit of a subsequent buffering period, $t_{ai,earliest}(m)$ is derived as $t_{ai,earliest}(m) = t_{r,n}(m) - (\text{InitCpbRemovalDelay[SchedSelIdx]} + \text{InitCpbRemovalDelayOffset[SchedSelIdx]}) \div 90000$ with $t_{r,n}(m)$ being the nominal removal time of decoding unit m from the CPB as specified in subclause C.2.2 of HEVC Draft 8. Otherwise (decoding unit m is the first decoding unit of a subsequent buffering period), $t_{ai,earliest}(m)$ is derived as $t_{ai,earliest}(m) = t_{r,n}(m) - (\text{InitCpbRemovalDelay[SchedSelIdx]} \div 90000)$.

The final arrival time for decoding unit m may be derived by $t_{af}(m) = t_{ai}(m) + b(m) \div \text{BitRate[SchedSelIdx]}$, where $b(m)$ is the size in bits of decoding unit m, counting the bits of the VCL NAL units and the filler data NAL units for the Type I conformance point or all bits of the Type II bitstream for the Type II conformance point, where the Type I and Type II conformance points are as shown in Figure C-1 of HEVC Draft 8.

The values of SchedSelIdx, BitRate[SchedSelIdx], and CpbSize[SchedSelIdx] may be constrained as follows. If the content of the active sequence parameter sets for the access unit containing decoding unit m and the previous access unit differ, the hypothetical stream delivery scheduler (HSS) may select a value SchedSelIdx1 of SchedSelIdx from among the values of SchedSelIdx provided in the active sequence parameter set for the access unit containing decoding unit m that results in a BitRate[SchedSelIdx1] or CpbSize[SchedSelIdx1] for the access unit containing decoding unit m. The value of BitRate[SchedSelIdx1] or CpbSize[SchedSelIdx1] may differ from the value of BitRate[SchedSelIdx0] or CpbSize[SchedSelIdx0] for the value SchedSelIdx0 of SchedSelIdx that was in use for the previous access unit. Otherwise, the HSS may continue to operate with the previous values of SchedSelIdx, BitRate[SchedSelIdx] and CpbSize[SchedSelIdx].

When the HSS selects values of BitRate[SchedSelIdx] or CpbSize[SchedSelIdx] that differ from those of the previous access unit, the following may apply. First, the variable BitRate[SchedSelIdx] comes into effect at time $t_{ai}(m)$. Second, the variable CpbSize[SchedSelIdx] comes into effect as follows. If the new value of CpbSize[SchedSelIdx] is greater than the old CPB size, it comes into effect at time $t_{ai}(m)$. Otherwise, the new value of CpbSize[SchedSelIdx] comes into effect at the CPB removal time of the last decoding unit of the access unit containing decoding unit m.

When SubPicCpbFlag is equal to 1, the initial CPB arrival time of access unit n $t_{ai}(n)$ may be set to the initial CPB arrival time of the first decoding unit in access unit n, and the final CPB arrival time of access unit n $t_{af}(n)$ may be set to the final CPB arrival time of the last decoding unit in access unit n. It should be noted that when SubPicCpbFlag is equal to 0, each decoding unit is an access unit, hence the initial and final CPB arrival times of access unit n may be the initial and final CPB arrival times of decoding unit n.

The access unit that is associated with a buffering period Supplemental Enhancement Information (SEI) message that initializes the CPB may be referred to as access unit 0. All other access units may be referred to as access unit n, with n being incremented by 1 for the next access unit in decoding order.

As illustrated by the foregoing, the systems and methods disclosed herein provide syntax and semantics that modify HRD parameters and sub-layer HRD parameters. In some configurations, the systems and methods disclosed herein may be applied to HEVC specifications. For example, Table 1 below provides an example of syntax modifications to the HRD parameters. Modifications are shown in bold.

TABLE 1

```
hrd_parameters( commonInfPresentFlag, MaxNumSubLayersMinus 1) {
    if( commonInfPresentFlag ) {
        timing_info_present_flag
        if( timing_info_present_flag ) {
            num_units_in_tick
            time_scale
        }
        nal_hrd_parameters_present_flag
        vcl_hrd_parameters_present_flag
        if( nal_hrd_parameters_present_flag || vcl_hrd_parameters_present_flag ){
            sub_pic_cpb_params_present_flag
            if( sub_pic_cpb_params_present_flag ) {
                tick_divisor_minus2
                du_cpb_removal_delay_length_minus1
            }
            bit_rate_scale
            cpb_size_scale
            if( sub_pic_cpb_params_present_flag ) {
                du_cpb_size_scale
            }
            initial_cpb_removal_delay_length_minus1
            cpb_removal_delay_length_minus1
            dpb_output_delay_length_minus1
        }
    }
    for( i = 0; i <= MaxNumSubLayersMinus1; i++ ) {
        fixed_pic_rate_flag[i]
        if( fixed_pic_rate_flag[i] )
            pic_duration_in_tc_minus1[i]
        low_delay_hrd_flag [i]
        cpb_cnt_minus1[i]
        if( nal_hrd_parameters_present_flag )
            sub_layer_hrd_parameters( i )
        if( vcl_hrd_parameters_present_flag )
            sub_layer_hrd_parameters( i )
    }
}
```

Examples regarding HRD parameters semantics shown in Table 1, in accordance with the systems and methods disclosed herein, are given as follows. timing_info_present_flag equal to 1 may specify that num_units_in_tick and time_scale are present in the hrd_parameters( ) syntax structure. timing_info_present_flag equal to 0 may specify that num_units_in_tick and time_scale are not present in the hrd_parameters( ) syntax structure.

num_units_in_tick may be the number of time units of a clock operating at the frequency time_scale Hz that corresponds to one increment (called a clock tick) of a clock tick counter. num_units_in_tick is generally greater than 0. A clock tick may be the minimum interval of time that can be represented in the coded data when sub_pic_cpb_params_present_flag is equal to 0. For example, when the picture rate of a video signal is 25 Hz, time_scale may be equal to 27,000,000 and num_units_in_tick may be equal to 1,080,000.

time_scale may be the number of time units that pass in one second. For example, a time coordinate system that measures time using a 27 MHz clock has a time_scale of 27,000,000. time_scale is generally greater than 0.

nal_hrd_parameters_present_flag equal to 1 may specify that NAL HRD parameters (pertaining to Type II bitstream conformance) are present in the hrd_parameters( ) syntax structure. nal_hrd_parameters_present_flag equal to 0 specifies that NAL HRD parameters are not present in the hrd_parameters( ) syntax structure. It should be noted that when nal_hrd_parameters_present_flag is equal to 0, the conformance of the bitstream cannot be verified without provision of the NAL HRD parameters and all buffering period and picture timing SEI messages.

The variable NalHrdBpPresentFlag may be derived as follows. If one or more of the following conditions are true, the value of NalHrdBpPresentFlag is set equal to 1. In this case, nal_hrd_parameters_present_flag may be present in the bitstream and may be equal to 1. Also, in this case, the need for presence of buffering periods for NAL HRD operation to be present in the bitstream in buffering period SEI messages may be determined by the application. Otherwise, the value of NalHrdBpPresentFlag may be set equal to 0.

vcl_hrd_parameters_present_flag equal to 1 may specify that VCL HRD parameters (pertaining to all bitstream conformance) are present in the hrd_parameters( ) syntax structure. vcl_hrd_parameters_present_flag equal to 0 may specify that VCL HRD parameters are not present in the hrd_parameters( ) syntax structure. It should be noted that when vcl_hrd_parameters_present_flag is equal to 0, the conformance of the bitstream cannot be verified without provision of the VCL HRD parameters and all buffering period and picture timing SEI messages.

The variable VclHrdBpPresentFlag is derived as follows. If one or more of the following conditions are true, the value of VclHrdBpPresentFlag may be set equal to 1. First, vcl_hrd_parameters_present_flag is present in the bitstream and is equal to 1. Second, the need for presence of buffering periods for VCL HRD operation to be present in the bitstream in buffering period SEI messages is determined by the application. Otherwise, the value of VclHrdBpPresentFlag may be set equal to 0.

The variable CpbDpbDelaysPresentFlag is derived as follows. If one or more of the following conditions are true, the value of CpbDpbDelaysPresentFlag may be set equal to 1. First, nal_hrd_parameters_present_flag is present in the bitstream and is equal to 1. Second, vcl_hrd_parameters_present_flag is present in the bitstream and is equal to 1. Third, the need for presence of CPB and DPB output delays to be present in the bitstream in picture timing SEI messages is determined by the application. Otherwise, the value of CpbDpbDelaysPresentFlag may be set equal to 0.

sub_pic_cpb_params_present_flag equal to 1 may specify that sub-picture level CPB removal delay parameters are present and the CPB may operate at access unit level or sub-picture level. sub_pic_cpb_params_present_flag equal to 0 may specify that sub-picture level CPB removal delay parameters are not present and the CPB operates at access unit level. When sub_pic_cpb_params_present_flag is not present, its value may be inferred to be equal to 0.

tick_divisor_minus2 may specify the sub-picture clock tick. A sub-picture clock tick may be the minimum interval of time that can be represented in the coded data when sub_pic_cpb_params_present_flag is equal to 1.

du_cpb_removal_delay_length_minus1 plus 1 may specify the length, in bits, of the du_cpb_removal_delay_minus1[i] and common_du_cpb_removal_delay_minus1 syntax elements of the picture timing SEI message. bit_rate_scale, together with bit_rate_value_minus1[SchedSelIdx], may specify the maximum input bit rate of the SchedSelIdx-th CPB.

cpb_size_scale, together with cpb_size_value_minus1[SchedSelIdx], may specify the CPB size of the SchedSelIdx-th CPB when operating at access unit level. du_cpb_size_scale, together with du_cpb_size_value_minus1[SchedSelIdx], may specify the CPB size of the SchedSelIdx-th CPB when operating at sub-picture level.

initial_cpb_removal_delay_length_minus1 plus 1 may specify the length, in bits, of the initial_cpb_removal_delay[SchedSelIdx] and initial_cpb_removal_delay_offset[SchedSelIdx] syntax elements of the buffering period SEI message. When the initial_cpb_removal_delay_length_minus syntax element is not present, it may be inferred to be equal to 23.

cpb_removal_delay_length_minus1 plus 1 may specify the length, in bits, of the cpb_removal_delay syntax element in the picture timing SEI message. When the cpb_removal_delay_length_minus1 syntax element is not present, it may be inferred to be equal to 23.

dpb_output_delay_length_minus1 plus 1 may specify the length, in bits, of the dpb_output_delay syntax element in the picture timing SEI message. When the dpb_output_delay_length_minus1 syntax element is not present, it may be inferred to be equal to 23.

fixed_pic_rate_flag[i] equal to 1 may indicate that, when HighestTid is equal to i, the temporal distance between the HRD output times of any two consecutive pictures in output order is constrained as follows. fixed_pic_rate_flag[i] equal to 0 indicates that no such constraints apply to the temporal distance between the HRD output times of any two consecutive pictures in output order. When fixed_pic_rate_flag[i] is not present, it may be inferred to be equal to 0.

When HighestTid is equal to i and fixed_pic_rate_flag[i] is equal to 1 for a coded video sequence containing picture n, the value computed for $\Delta t_{o,dpb}(n)$, as specified in Equation C-17 of HEVC Draft 8, may be equal to tc*(pic_duration_in_tcs_minus1[i]+1), wherein tc is as specified in Equation C-1 of HEVC Draft 8 (using the value of tc for the coded video sequence containing picture n) when one or more of the following conditions are true for the following picture nn that is specified for use in Equation C-17. First, picture nn is in the same coded video sequence as picture n. Second, picture nn is in a different coded video sequence and fixed_pic_rate_flag[i] is equal to 1 in the coded video sequence containing picture nn, the value of num_units_in_tick÷time_scale is the same for both coded video sequences, and the value of pic_duration_in_tc_minus1[i] is the same for both coded video sequences.

pic_duration_in_tc_minus1[i] plus 1 may specify, when HighestTid is equal to i, the temporal distance, in clock ticks, between the HRD output times of any two consecutive pictures in output order in the coded video sequence. The value of pic_duration_in_tc_minus1[i] may range from 0 to 2047, inclusive.

low_delay_hrd_flag[i] may specify the HRD operational mode, when HighestTid is equal to i, as specified in Annex C of HEVC Draft 8. When fixed_pic_rate_flag[i] is equal to 1, low_delay_hrd_flag[i] may be equal to 0. It should be noted that when low_delay_hrd_flag[i] is equal to 1, "big pictures" that violate the nominal CPB removal times due to the number of bits used by an access unit may be permitted. It is expected, but not required, that such "big pictures" occur only occasionally.

cpb_cnt_minus1[i] plus 1 may specify the number of alternative CPB specifications in the bitstream of the coded video sequence when HighestTid is equal to i. The value of cpb_cnt_minus1[i] may range from 0 to 31, inclusive. When low_delay_hrd_flag[i] is equal to 1, cpb_cnt_minus1[i] may be equal to 0. When cpb_cnt_minus1[i] is not present, it may be inferred to be equal to 0.

As another example, Table 2 below provides alternative syntax HRD parameters. Modifications are shown in bold.

TABLE 2

```
hrd_parameters( commonInfPresentFlag, MaxNumSubLayersMinus1 ) {
   if( commonInfPresentFlag ) {
      timing_info_present_flag
      if( timing_info_present_flag ) {
         num_units_in_tick
         time_scale
      }
      nal_hrd_parameters_present_flag
      vcl_hrd_parameters_present_flag
      if( nal_hrd_parameters_present_flag | | vcl_hrd_parameters_present_flag ){
         sub_pic_cpb_params_present_flag
         if( sub_pic_cpb_params_present_flag ) {
            tick_divisor_minus2
            du_cpb_removal_delay_length_minus1
            du_cpb_size_scale
         }
         bit_rate_scale
         cpb_size_scale
         . . .
      }
}
```

Table 2 shows that, in some configurations, the syntax elements may be signaled at different positions. Additionally, in some configurations, the syntax element du_cpb_size_scale may be coded as u(4), which may indicate the number of bits employed. A different number of bits than that indicated by u(4) may be used. For example, du_cpb_size_scale may be coded as ue(v) or using some other coding technique.

Table 3 below provides syntax modifications to sub-layer HRD parameters. Modifications are shown in bold.

TABLE 3

```
sub_layer_hrd_parameters( tId ) {
   for(    SchedSelIdx = 0; SchedSelIdx <= cpb_cnt_minus1[i];
        SchedSelIdx++ ) {
      bit_rate_value_minus1[SchedSelIdx]
      cpb_size_value_minus1[SchedSelIdx]
      if( sub_pic_cpb_params_present_flag ) {
```

TABLE 3-continued

```
         du_cpb_size_value_minus1[SchedSelIdx]
      }
      cbr_flag[SchedSelIdx]
   }
}
```

Examples regarding sub-layer HRD parameters semantics are shown in Table 3, in accordance with the systems and methods disclosed herein, are given as follows. bit_rate_value_minus1[SchedSelIdx], together with bit_rate_scale, may specify the maximum input bit rate for the SchedSelIdx th CPB. bit_rate_value_minus1[SchedSelIdx] may range from 0 to 232-2, inclusive. For any SchedSelIdx>0, bit_rate_value_minus1[SchedSelIdx] may be greater than bit_rate_value_minus1[SchedSelIdx−1]. The bit rate in bits per second is given by $$BitRate[SchedSelIdx]=(bit\_rate\_value\_minus1[SchedSelIdx]+1)*2^{(6+bit\_rate\_scale)}.$$

When the bit_rate_value_minus1[SchedSelIdx] syntax element is not present, the value of BitRate[SchedSelIdx] may be inferred to be equal to cpbBrVclFactor*MaxBR for VCL HRD parameters and may be inferred to be equal to cpbBrNalFactor*MaxBR for NAL HRD parameters, where MaxBR, cpbBrVclFactor and cpbBrNalFactor are specified in subclause A.4 of HEVC Draft 8.

cpb_size_value_minus1[SchedSelIdx] may be used together with cpb_size_scale to specify the SchedSelIdx-th CPB size. cpb_size_value_minus1[SchedSelIdx] may range from 0 to 232-2, inclusive. For any SchedSelIdx greater than 0, cpb_size_value_minus1[SchedSelIdx] may be less than or equal to cpb_size_value_minus1[SchedSelIdx−1].

When SubPicCpbFlag is equal to 0, the CPB size in bits is given by $CpbSize[SchedSelIdx]=(cpb\_size\_value\_minus1[SchedSelIdx]+1)*2^{(4+cpb\_size\_scale)}$.

When the cpb_size_value_minus1[SchedSelIdx] syntax element is not present, the value of CpbSize[SchedSelIdx] may be inferred to be equal to cpbBrVclFactor*MaxCPB for VCL HRD parameters and may be inferred to be equal to cpbBrNalFactor*MaxCPB for NAL HRD parameters, where MaxCPB, cpbBrVclFactor and cpbBrNalFactor are specified in subclause A.4 of HEVC Draft 8.

du_cpb_size_value_minus1[SchedSelIdx] may be used together with du_cpb_size_scale to specify the SchedSelIdx-th CPB size when operating at sub-picture level. du_cpb_size_value_minus1[SchedSelIdx] may range from 0 to $2^{32}-2$, inclusive. For any SchedSelIdx greater than 0, du_cpb_size_value_minus1[SchedSelIdx] may be less than or equal to du_cpb_size_value_minus1[SchedSelIdx−1].

When SubPicCpbFlag is equal to 1, the CPB size in bits is given by $$CpbSize[SchedSelIdx] = (du\_cpb\_size\_value\_minus1[SchedSelIdx]+1) * 2^{(4+du\_cpb\_size\_scale)}.$$

When the du_cpb_size_value_minus1[SchedSelIdx] syntax element is not present, the value of CpbSize[SchedSelIdx] may be inferred to be equal to cpbBrVclFactor*MaxCPB for VCL HRD parameters and may be inferred to be equal to cpbBrNalFactor*MaxCPB for NAL HRD parameters, where MaxCPB, cpbBrVclFactor and cpbBrNalFactor are specified in subclause A.4 of HEVC Draft 8.

cbrflag[SchedSelIdx] equal to 0 may specify that to decode this bitstream by the HRD using the SchedSelIdx-th CPB specification, the hypothetical stream delivery scheduler (HSS) operates in an intermittent bit rate mode. cbr_flag [SchedSelIdx] equal to 1 may specify that the HSS operates in a constant bit rate (CBR) mode. When the cbr_flag [SchedSelIdx] syntax element is not present, the value of cbr_flag is inferred to be equal to 0.

For convenience, several definitions are given as follows, which may be applied to the systems and methods disclosed herein. A decoding unit (DU) may be an access unit or a subset of an access unit. If a sub-picture CPB flag is equal to 0, the decoding unit is an access unit. Otherwise, the decoding unit is a subset of the access unit, such as a sub-picture access unit or an access unit operating on a sub-picture level. The decoding unit may consist of one or more VCL NAL units in an access unit and associated non-VCL NAL units.

A buffering period may be specified as a set of access units between two instances of the buffering period SEI message in decoding order. Supplemental Enhancement Information (SEI) may include information that is not necessary to decode the samples of coded pictures from VCL NAL units. SEI messages may assist in procedures related to decoding, display or other purposes. However, SEI messages may not be required for constructing luma or chroma samples by a decoding process. Conforming decoders may not be required to process this information for output order conformance to HEVC specifications (Annex C of HEVC Draft 8 includes specifications for conformance, for example). Some SEI message information may be required to check bitstream conformance and for output timing decoder conformance.

A buffering period SEI message may be an SEI message related to buffering period. It may define syntax and semantics that define bitstream arrival timing and coded picture removal timing.

A Picture Parameter Set (PPS) is a syntax structure containing syntax elements that apply to zero or more entire coded pictures as determined by the pic_parameter_set_id syntax element found in each slice header. pic_parameter_set_id may identify the picture parameter set that is referred to in the slice header. The value of pic_parameter_set_id may be in the range of 0 to 255, inclusive.

A Coded Picture Buffer (CPB) may be a first-in first-out buffer containing access units in decoding order specified in a hypothetical reference decoder (HRD). An access unit may be a set of Network Access Layer (NAL) units that are consecutive in decoding order and include exactly one coded picture. In addition to the coded slice NAL units of the coded picture, the access unit may also include other NAL units not containing slices of the coded picture. The decoding of an access unit always results in a decoded picture. A NAL unit may be a syntax structure containing an indication of the type of data to follow and bytes containing that data in the form of a raw byte sequence payload (RBSP) interspersed as necessary with emulation prevention bytes.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating an example of one or more electronic devices 102 in which systems and methods for signaling a sub-picture buffer parameter may be implemented. In this example, electronic device A 102a and electronic device B 102b are illustrated. However, it should be noted that one or more of the features and functionality described in relation to electronic device A 102a and electronic device B 102b may be combined into a single electronic device in some configurations.

Electronic device A 102a includes an encoder 104. The encoder 104 includes a sub-picture buffer parameter generation module 108. Each of the elements included within electronic device A 102a (e.g., the encoder 104 and the sub-picture buffer parameter generation module 108) may be implemented in hardware, software or a combination of both.

Electronic device A 102a may obtain one or more input pictures 106. In some configurations, the input picture(s) 106 may be captured on electronic device A 102a using an image sensor, may be retrieved from memory and/or may be received from another electronic device.

The encoder 104 may encode the input picture(s) 106 to produce encoded data. For example, the encoder 104 may encode a series of input pictures 106 (e.g., video). In one configuration, the encoder 104 may be an HEVC encoder. The encoded data may be digital data (e.g., part of a bitstream 114). The encoder 104 may generate overhead signaling based on the input signal.

The sub-picture buffer parameter generation module 108 may generate one or more sub-picture buffer parameters. The electronic device 102 (e.g., the encoder 104) may determine whether a picture is allowed to be decoded on a sub-picture level. In some cases, this may be determined based on whether a picture is encoded on a sub-picture level. In some instances, the electronic device may determine whether the picture is allowed to be decoded on a sub-picture level in addition to being allowed to be decoded at a picture level. If the picture is allowed to be decoded on a sub-picture level, then the sub-picture buffer parameter generation module 108 may generate a buffer size parameter and/or a buffer scale parameter. For example, the buffer size parameter may be a sub-picture CPB size value parameter, such as du_cpb_size_value_minus1. As another example, the buffer scale parameter may be a sub-picture CPB size scale parameter, such as du_cpb_size_scale.

The sub-picture buffer parameter generation module 108 may perform one or more of the procedures described in connection with FIG. 2, FIG. 3 and FIG. 4 below. In some configurations, electronic device A 102*a* may send data, such as encoded picture information, to electronic device B 102*b* as part of the bitstream 114. In some configurations, electronic device A 102*a* may send a message to electronic device B 102*b* by a separate transmission 110. For example, the separate transmission 110 may not be part of the bitstream 114. For instance, a buffering period SEI message or other message may be sent using some out-of-band mechanism. It should be noted that, in some configurations, the message may include one or more of the features of the sub-picture CPB size scale parameter and/or another type of message, such as a buffering period SEI message.

The encoder 104 (and sub-picture buffer parameter generation module 108, for example) may produce a bitstream 114. The bitstream 114 may include encoded picture data based on the input picture(s) 106. In some configurations, the bitstream 114 may also include overhead data, such as a sub-picture CPB size scale parameter, a buffering period SEI message or other message, slice header(s), PPS(s), etc. As additional input pictures 106 are encoded, the bitstream 114 may include one or more encoded pictures. For instance, the bitstream 114 may include one or more encoded pictures with corresponding overhead data.

The bitstream 114 may be provided to a decoder 112. In one example, the bitstream 114 may be transmitted to electronic device B 102*b* using a wired or wireless link. In some cases, this may be done over a network, such as the Internet or a Local Area Network (LAN). As illustrated in FIG. 1, the decoder 112 may be implemented on electronic device B 102*b* separately from the encoder 104 on electronic device A 102*a*. However, it should be noted that the encoder 104 and decoder 112 may be implemented on the same electronic device in some configurations. In an implementation where the encoder 104 and decoder 112 are implemented on the same electronic device, for instance, the bitstream 114 may be provided over a bus to the decoder 112 or stored in memory for retrieval by the decoder 112.

The decoder 112 may be implemented in hardware, software or a combination of both. In one configuration, the decoder 112 may be an HEVC decoder. The decoder 112 may receive (e.g., obtain) the bitstream 114. The decoder 112 may generate one or more decoded pictures 118 based on the bitstream 114. The decoded picture(s) 118 may be displayed, played back, stored in memory and/or transmitted to another device, etc.

The decoder 112 may receive data (e.g., encoded picture data). The decoder may also receive a buffer parameter. For example, the decoder 112 may receive a sub-picture CPB size scale parameter such as du_cpb_size_scale. It should be noted that the sub-picture level buffer parameters (e.g., du_cpb_size_scale and du_cpb_size_value_minus1[SchedSelIdx]), are sent in addition to the corresponding picture level parameters (e.g., cpb_size_scale and cpb_size_value_minus1[SchedSelIdx]). Also, the sub-picture level buffer parameters, in most instances, differ from corresponding parameters at the picture level. Additionally, it should be noted that these parameters are sent for multiple bit rate values with SchedSelIdx indicating the index for the multiple different bitrate values.

The decoder 112 may include a CPB 120. The CPB 120 may temporarily store encoded pictures. For example, the CPB 120 may store encoded pictures until a removal time. In accordance with the systems and methods disclosed herein, the storing and retaining of encoded picture may be based on, in part, by the decoder 112 based on a sub-picture CPB size scale and sub-picture CPS size parameters.

The decoder 112 may perform an interpolated delivery schedule test for sub-picture level CPB operation based on the sub-picture level CPB parameter. In some configurations, the decoder 112 may operate at interpolated delivery bit rate. For example, the decoder 112 may include a decoder under test (DUT) (not shown) and the DUT may use the buffer parameter, such as a sub-picture CPB parameter, to verify that bitstream constraints are being regulated and that pictures are being properly encoded by the encoder 104. The decoder 112 may perform one or more of the procedures described in connection with FIG. 5 below.

The HRD described above may be one example of the decoder 112 illustrated in FIG. 1. Thus, an electronic device 102 may operate in accordance with the HRD and CPB described above, in some configurations.

It should be noted that one or more of the elements or parts thereof included in the electronic device(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an Application-Specific Integrated Circuit (ASIC), a Large-Scale Integrated circuit (LSI) or integrated circuit, etc.

Figure 2:
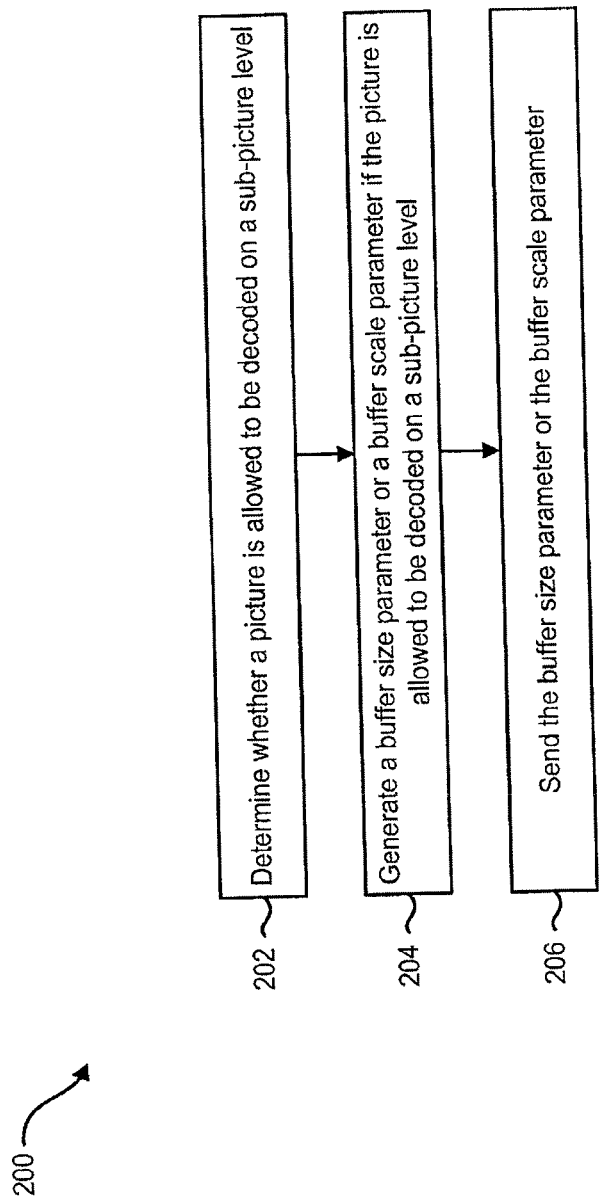
FIG. 2 is a flow diagram illustrating one configuration of a method for sending a sub-picture buffer parameter.

FIG. 2 is a flow diagram illustrating one configuration of a method 200 for sending a sub-picture buffer parameter. An electronic device 102 (e.g., electronic device A 102*a*) may determine 202 whether a picture is allowed to be decoded on a sub-picture level. In some instances, the electronic device 102 may determine 202 whether the picture is allowed to be decoded on a sub-picture level in addition to being allowed to be decoded at a picture level. For example, the encoder 104 may determine to encode the input picture 106 at a sub-picture level picture. It should be appreciated that sub-picture level decoding can be enabled by using various tools defined in HEVC specification, such as, but not limited to, tiles, slices, wavefronts, entropy slices, dependent slices, etc.

If the encoder 104 determines 202 that the picture is allowed to be decoded on a sub-picture level, and in some instances, the picture is allowed to be decoded on a sub-picture level in addition to a picture level, the electronic device 102 may generate 204*a* buffer size parameter and/or a buffer scale parameter. Otherwise, the electronic device 102 may determine 202 that the picture is not allowed to be decoded on a sub-picture level.

Accordingly, the electronic device 102 may generate 204*a* buffer size parameter and/or a buffer scale parameter if the picture is allowed to be decoded on a sub-picture level. In some instances, the electronic device 102 may generate 204*a* buffer size parameter and/or a buffer scale parameter if the picture is allowed to be decoded on a sub-picture level in addition to the picture level.

In some configurations, the electronic device 102 may generate 204 two buffer size parameters and/or two buffer scale parameters. One of the two buffer size parameters may correspond to an operation at the picture level and the other buffer size parameters may correspond to an operation as a sub-picture level. Similarly, one of the two buffer scale parameters may correspond to an operation at the picture level and the other buffer scale parameters may correspond to an operation as a sub-picture level.

The buffer may be a coded picture buffer (CPB). The buffer size parameter may be a sub-picture CPB size value parameter, such as du_cpb_size_value_minus1[Sched- SelIdx], as illustrated in Table 3 above, where SchedSelIdx is an index variable. For example, the sub-picture CPB size value parameter may be used together with a sub-picture size scale parameter to specify the CPB size for each index value when operating at sub-picture level. Each index value may correspond to a different bitrate value. By specifying the CPB size, overflows and underflows may be prevented, while maintaining a constant output rate.

The buffer scale parameter may be a sub-picture CPB size scale parameter, such as du_cpb_size_scale, as illustrated in Table 1 and Table 2 above. The sub-picture CPB size scale size parameter may specify the CPB size for each index value when operating at sub-picture level. The sub-picture CPB size scale size parameter may be used together with a buffer size parameter, such as the sub-picture CPB size value parameter.

In one configuration, the buffer scale parameter may additionally be a sub-picture bit rate scale parameter, such as du_bit_rate_scale, which is defined in Table 4. Table 4 below provides alternative syntax HRD parameters. Modifications to known syntax are shown in bold.

TABLE 4

```
hrd_parameters( commonInfPresentFlag, MaxNumSubLayersMinus1 ) {
    if( commonInfPresentFlag ) {
        timing_info_present_flag
        if( timing_info_present_flag ) {
            num_units_in_tick
            time_scale
        }
        nal_hrd_parameters_present_flag
        vcl_hrd_parameters_present_flag
        if( nal_hrd_parameters_present_flag | | vcl_hrd_parameters_present_flag ){
            sub_pic_cpb_params_present_flag
            if( sub_pic_cpb_params_present_flag ) {
                tick_divisor_minus2
                du_cpb_removal_delay_length_minus1
            }
            bit_rate_scale
            du_bit_rate_scale
            cpb_size_scale
            . . .
        }
    }
}
```

Examples regarding HRD parameters semantics shown in Table 4, in accordance with the systems and methods disclosed herein, are given as follows. bit_rate_scale, together with bit_rate_value_minus1[SchedSelIdx], may specify the maximum input bit rate of the SchedSelIdx-th CPB when operating at access unit level. du_bit_rate_scale, together with bit_rate_value_minus1[SchedSelIdx], may specify the maximum input bit rate of the SchedSelIdx-th CPB when operating at sub-picture level. Other semantics may be employed as described above in connection with Tables 1-3 above.

Table 5 below provides syntax modifications to sub-layer HRD parameters. Modifications to known syntax are shown in bold.

TABLE 5

```
sub_layer_hrd_parameters( tId ) {
    for(    SchedSelIdx = 0; SchedSelIdx <= cpb_cnt_minus1[i];
        SchedSelIdx++ ) {
        bit_rate_value_minus1[SchedSelIdx]
        cpb_size_value_minus1[SchedSelIdx]
        cbr_flag[SchedSelIdx]
        if( sub_pic_cpb_params_present_flag ) {
            du_bit_rate_value_minus1[SchedSelIdx]
```

TABLE 5-continued

```
            du_cpb_size_value_minus1[SchedSelIdx]
            du_cbr_flag[SchedSelIdx]
        }
    }
}
```

Examples regarding sub-layer HRD parameters semantics shown in Table 5, in accordance with the systems and methods disclosed herein, are given as follows. du_bit_rate_value_minus1[SchedSelIdx], together with du_bit_rate_scale, may specify the maximum input bit rate for the SchedSelIdx-th CPB when operating at sub-picture level. du_bit_rate_value_minus1[SchedSelIdx] may range from 0 to $2^{32}-2$, inclusive. For any SchedSelIdx>0, du_bit_rate_value_minus1[SchedSelIdx] may be greater than du_bit_rate_value_minus1[SchedSelIdx-1]. When SubPicCpbFlag is equal to 1, the bit rate in bits per second may be given by BitRate[SchedSelIdx]=(du_bit_rate_value_minus1[SchedSelIdx]+1)*$2^{(6+du\_bit\_rate\_scale)}$.

When the du_bit_rate_value_minus1[SchedSelIdx] syntax element is not present, the value of BitRate[SchedSelIdx] may be inferred to be equal to cpbBrVclFactor*MaxBR for VCL HRD parameters and may be equal to cpbBrNalFactor*MaxBR for NAL HRD parameters, where MaxBR, cpbBrVclFactor and cpbBrNalFactor are specified in subclause A.4 of HEVC Draft 8.

du_cpb_size_value_minus1[SchedSelIdx] may be used together with du_cpb_size_scale to specify the SchedSelIdx-th CPB size when operating at sub-picture level. du_cpb_size_value_minus1[SchedSelIdx] may range from 0 to $2^{32}-2$, inclusive. For any SchedSelIdx greater than 0, du_cpb_size_value_minus1[SchedSelIdx] may be less than or equal to du_cpb_size_value_minus1[SchedSelIdx-1].

du_cbr_flag[SchedSelIdx] equal to 0 may specify that to decode this bitstream by the HRD using the SchedSelIdx-th CPB specification when operating at sub-picture level, the hypothetical stream delivery scheduler (HSS) may operate in an intermittent bit rate mode. du_cbr_flag[SchedSelIdx] equal to 1 may specify that the HSS operates in a constant bit rate (CBR) mode. When the du_cbr_flag[SchedSelIdx] syntax element is not present, the value of du_cbr_flag may be inferred to be equal to 0. Other semantics may be employed as described above in connection with Tables 1-4 above.

In some configurations, such as those shown in Table 4 and Table 5, separate values of bit rate scale, bit rate and/or CBR flag parameters may be signaled for sub-picture level operation points compared to those parameter values for access unit level operation points. In other words, the sub-picture level of CPB operation may have one set of bit rate scale, bit rate and/or CBR flag parameters, while the access unit level of CPB operation may have another set of bit rate scale, bit rate and/or CBR flag parameters.

Returning the FIG. 2, the sub-picture bit rate scale parameter may be employed in addition to, or in place of the sub-picture CPB size scale parameter. The sub-picture bit rate scale parameter may be du_bit_rate_scale. The sub-picture bit rate scale parameter may specify the maximum input bit rate for each index value in the CPB when operating at sub-picture level. The sub-picture bit rate scale parameter may be employed by the electronic device 102 along with a bit rate value parameter, such as bit_rate_value_minus1[SchedSelIdx], where SchedSelIdx indicates an index value.

The electronic device 102 may send 206 the buffer parameter (e.g., the buffer size parameter and/or the buffer scale parameter). For example, the electronic device 102 may transmit the buffer parameter via one or more of wireless transmission, wired transmission, device bus, network, etc. For instance, electronic device A 102a may transmit the buffer parameter to electronic device B 102b. The buffer parameter may be part of the bitstream 114, for example. In some configurations, electronic device A 102a may send 206 the buffer parameter to electronic device B 102b in a separate transmission 110 (that is not part of the bitstream 114). For instance, the buffer parameter may be sent using some out-of-band mechanism.

In the configuration where two buffer size parameters and/or two buffer scale parameters are generated, the electronic device 102 may send 206 the two buffer size parameters and/or the two buffer scale parameters.

Figure 3:
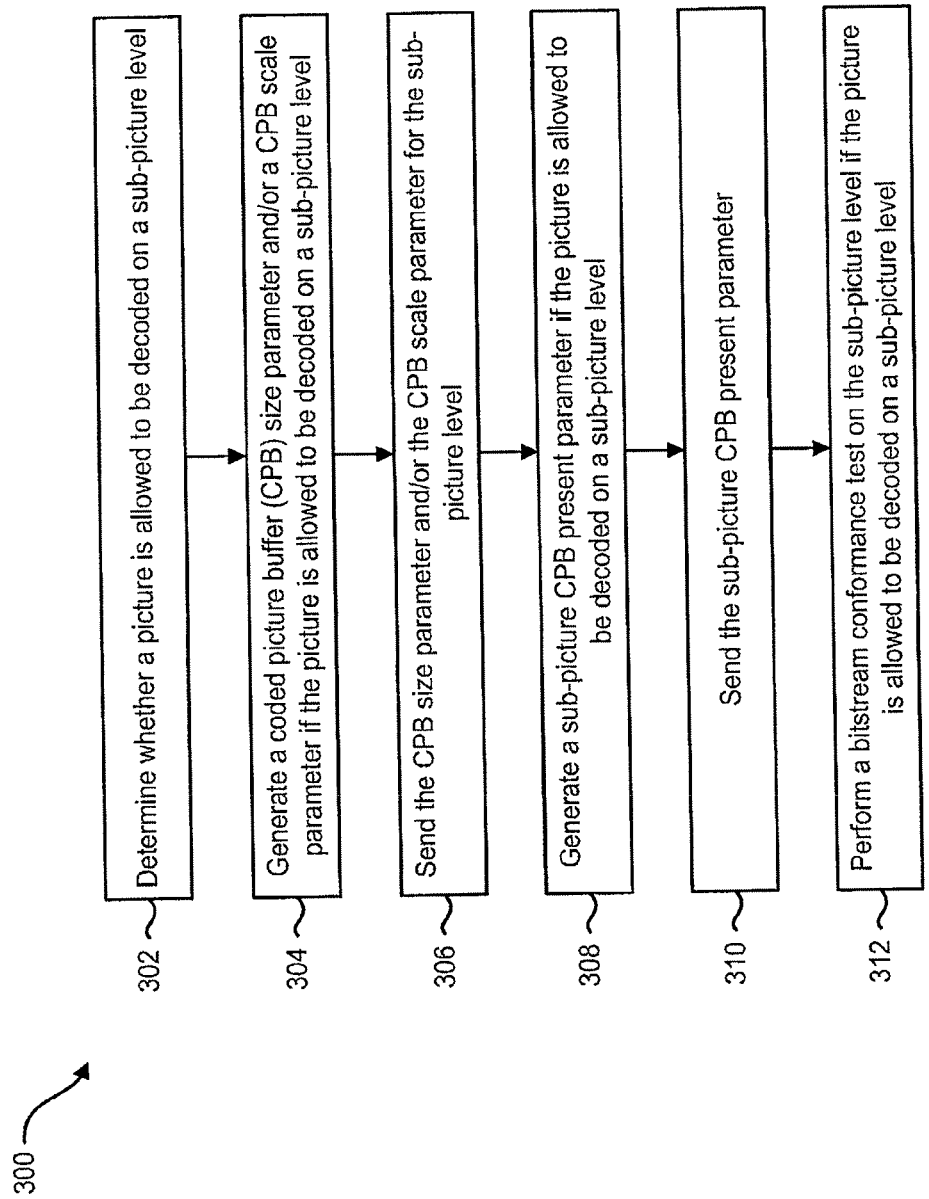
FIG. 3 is a flow diagram illustrating a more specific configuration of a method for sending a sub-picture buffer parameter.

FIG. 3 is a flow diagram illustrating a more specific configuration of a method 300 for sending a sub-picture buffer parameter. An electronic device 102 (e.g., electronic device A 102a) may determine 302 whether a picture is allowed to be decoded on a sub-picture level. In some instances, the electronic device 102 may determine 302 whether the picture is allowed to be decoded on a sub-picture level in addition to on a picture level. This may be accomplished as described in connection with FIG. 2 above.

The electronic device 102 may generate 304a CPB size parameter and/or a CPB scale parameter if the picture is allowed to be decoded on a sub-picture level. In some instances, the electronic device 102 generate 304a CPB size parameter and/or a CPB scale parameter if the picture is allowed to be decoded on a sub-picture level in addition to the picture level. This may be accomplished as described in connection with FIG. 2 above. The CPB size parameter may be a sub-picture CPB size parameter and the CPB scale parameter may be a sub-picture CPB scale parameter.

The electronic device 102 may send 306 the CPB size parameter and/or the CPB scale parameter for the sub-picture level. The CPB size parameter and/or the CPB scale parameter may be sent as part of the bitstream 114, for example. In some configurations, electronic device A 102a may send 306 the CPB size parameter and/or the CPB scale parameter for the sub-picture level to electronic device B 102b in a separate transmission 110 that is not part of the bitstream 114. For example, the CPB size parameter may be sent to electronic device B 102b to be used for testing transmitted pictures at the DUT.

The electronic device 102 may generate 308a sub-picture CPB present parameter if it is determined 302 that the picture is allowed to be decoded on a sub-picture level. In some instances, the electronic device 102 may generate 308a sub-picture CPB present parameter if it is determined 302 that the picture is allowed to be decoded on a sub-picture level in addition to on a picture. For example, the sub-picture CPB present parameter may be a flag, such as a sub-picture CPB present flag. The sub-picture CPB present flag may have a Boolean value indicating whether the electronic device 102 determined 302 to allow the picture (e.g., input picture 106) to be decoded on a sub-picture level. For example, the sub-picture CPB present flag may be set to positive (e.g., the sub-picture CPB present flag=1) when the electronic device 102 determined 302 to allow the picture to be decoded on a sub-picture level, and in some instances, on a picture level as well. The sub-picture CPB present flag may be sub_pic_cpb_params_present_flag, as described above in connection with Tables 1-5 above.

In some configurations, the sub-picture CPB present flag may be employed to determine if an operation should be executed. For example, the HRD may verify that the sub-picture CPB present flag is set to positive before obtaining and/or processing additional parameters for the sub-picture level or before executing commands on the sub-picture level. As another example, the HRD may verify that the sub-picture CPB present flag is set to positive before performing bitsream conformance tests on encoded sub-picture level pictures.

The electronic device 102 may send 310 the sub-picture CPB present parameter. For example, the electronic device 102 may transmit the sub-picture CPB parameter via one or more of wireless transmission, wired transmission, device bus, network, etc. For instance, electronic device A 102a may transmit the sub-picture CPB present parameter to electronic device B 102b. The sub-picture CPB present parameter may be part of the bitstream 114, for example. In some configurations, electronic device A 102a may send 310 the sub-picture CPB present parameter to electronic device B 102b in a separate transmission 110 that is not part of the bitstream 114. For example, the sub-picture CPB present parameter may be sent to electronic device B 102b to be used for testing transmitted encoded pictures at the DUT and/or for operation at sub-picture level.

The electronic device 102 may perform 312a bitstream conformance test on the sub-picture level, if the picture is allowed to be decoded on a sub-picture level. In some configurations, the electronic device 102 may perform 312a bitstream conformance test on the sub-picture level, if the picture is allowed to be decoded on both a sub-picture level and a picture level. The bitstream conformance test may be performed by the HRD on the encoder 104, for example. By performing a bitstream conformance test, the encoder 104 may verify that buffer overflow or buffer underflow will not occur at the CPB 120 at the decoder 112.

Bitstream conformance tests may be performed at the access unit level and/or the sub-picture level. In some configurations, a sub-picture CPB parameter is present, such as the sub-picture CPB present flag, may indicate if bitstream conformance tests should be performed at the access unit level or the sub-picture level. For example, the sub-picture CPB parameter may be set to positive and may indicate that one or more bitstream conformance tests should be performed at the sub-picture level. Bitstream conformance tests may test that the bit rate and CPB size combinations specified by the HRD parameters (e.g., Tables 1, 2 and 4) conform to the specified restrictions.

A bitstream of coded data conforming to HEVC Draft 8 may fulfil the following requirements. It may be a requirement of bitstream conformance that the first coded picture in a bitstream shall be a random access point (RAP) picture (i.e. an IDR picture or a CRA picture or a BLA picture). The bitstream may be tested by the HRD for conformance as follows. For Type I bitstreams, the number of tests carried out may be equal to cpb_cnt_minus1+1, where cpb_cnt_minus1 is either the syntax element of hrd_parameters( ) following the vcl_hrd_parameters_present_flag. One test may be carried out for access unit level CPB operation for each bit rate and CPB size combination specified by hrd_parameters( ) following the vcl_hrd_parameters_present_flag. An additional test may be performed for sub-picture level CPB operation for each bit rate and CPB size combination specified by hrd_parameters( ) following the vcl_hrd_parameters_present_flag if sub_pic_cpb_params_present_flag is equal to 1. Each of these tests may be conducted at the Type I conformance point shown in Figure C-1 of HEVC Draft 8.

For Type II bitstreams there can be two sets of tests. The number of tests of the first set may be equal to cpb_cnt_minus1+1, where cpb_cnt_minus1 is either the syntax element of hrd_parameters( ) following the vcl_hrd_parameters_present_flag or is determined by the application by other means not specified in this Specification. One test may be carried out for access unit level CPB operation for each bit rate and CPB size combination. An additional test may be performed for sub-picture level CPB operation for each bit rate and CPB size combination specified by hrd_parameters( ) following the vcl_hrd_parameters_present_flag if sub_pic_cpb_params_present_flag is equal to 1. Each of these tests may be conducted at the Type I conformance point shown in Figure C-1 of HEVC Draft 8. For these tests, only VCL and filler data NAL units may be counted for the input bit rate and CPB storage.

The number of tests of the second set, for Type II bitstreams, may be equal to cpb_cnt_minus1+1, where cpb_cnt_minus1 is either the syntax element of hrd_parameters( ) following the nal_hrd_parameters_present_flag or is determined by the application by other means not specified in this Specification. One test may be carried out for access unit level CPB operation for each bit rate and CPB size combination specified by hrd_parameters( ) following the nal_hrd_parameters_present_flag. An additional test may be performed for sub-picture level CPB operation for each bit rate and CPB size combination specified by hrd_parameters( ) following the vcl_hrd_parameters_present_flag if sub_pic_cpb_params_present_flag is equal to 1. Each of these tests may be conducted at the Type II conformance point shown in Figure C-1 of HEVC Draft 8. For these tests, all NAL units (of a Type II NAL unit stream) or all bytes (of a byte stream) may be counted for the input bit rate and CPB storage. It should be noted that NAL HRD parameters established by a value of SchedSelIdx for the Type II conformance point shown in Figure C-1 of HEVC Draft 8 may be sufficient to also establish VCL HRD conformance for the Type I conformance point shown in Figure C-1 of HEVC Draft 8 for the same values of InitCpbRemovalDelay[SchedSelIdx], BitRate[SchedSelIdx], and CpbSize[SchedSelIdx] for the VBR case (cbr_flag[SchedSelIdx] equal to 0). This is because the data flow into the Type I conformance point may be a subset of the data flow into the Type II conformance point and because, for the VBR case, the CPB may be allowed to become empty and stay empty until the time a next picture is scheduled to begin to arrive. For example, when decoding a coded video sequence conforming to one or more of the profiles specified in Annex A of HEVC Draft 8 using the decoding process specified in clauses 2-9 of HEVC Draft 8, when NAL HRD parameters are provided for the Type II conformance point that not only fall within the bounds set for NAL HRD parameters for profile conformance in item c of subclause A.4.2 of HEVC Draft 8 but also fall within the bounds set for VCL HRD parameters for profile conformance in item b) of subclause A.4.2 of HEVC Draft 8, conformance of the VCL HRD for the Type I conformance point is also assured to fall within the bounds of item b) of subclause A.4.2 of HEVC Draft 8.

For each current picture that is decoded, the variables maxPicOrderCnt and minPicOrderCnt may be set equal to the maximum and the minimum, respectively, of the PicOrderCntVal values of the current picture, the previous picture in decoding order that has TemporalId equal to 0, the short-term reference pictures in the reference picture set of the current picture and all pictures n that have PicOutputFlag equal to 1 and $t_r(n) < t_r(currPic)$ and $t_{o,dpb}(n) >= t_r(currPic)$, where currPic is the current picture.

It may be a requirement of bitstream conformance that all of the following 11 conditions shall be fulfilled for each of the tests. First, for each access unit n, with n>0, associated with a buffering period SEI message, with $\Delta t_{g,90}(n)$ specified by $\Delta t_{g,90}(n) = 90000 * (t_{r,n}(n) - t_{af}(n-1))$, the value of InitCpbRemovalDelay[SchedSelIdx] shall be constrained as follows. If cbr_flag[SchedSelIdx] may be equal to 0, InitCpbRemovalDelay[SchedSelIdx]<=Ceil($\Delta t_{g,90}(n)$). Otherwise (cbr_flag[SchedSelIdx] may be equal to 1), Floor($\Delta t_{g,90}(n)$) <=InitCpbRemovalDelay[SchedSelIdx]<=Ceil($\Delta t_{g,90}(n)$). It should be noted that the exact number of bits in the CPB at the removal time of each picture may depend on which buffering period SEI message is selected to initialize the HRD. Encoders must take this into account to ensure that all specified constraints must be obeyed regardless of which buffering period SEI message is selected to initialize the HRD, as the HRD may be initialized at any one of the buffering period SEI messages.

Second, a CPB overflow is specified as the condition in which the total number of bits in the CPB is larger than the CPB size. The CPB shall never overflow. Third, a CPB underflow is specified as the condition in which the nominal CPB removal time of decoding unit m $t_{r,n}(m)$ is less than the final CPB arrival time of decoding unit m $t_{af}(m)$ for any value of m. When low_delay_hrd_flag is equal to 0, the CPB shall never underflow.

Fourth, when low_delay_hrd_flag is equal to 1, a CPB underflow may occur at decoding unit m. In this case, the final CPB arrival time of access unit n containing decoding unit m $t_{af}(n)$ shall be later than the nominal CPB removal time of access unit n containing decoding unit m $t_{r,n}(n)$. Fifth, the nominal removal times of pictures from the CPB (starting from the second picture in decoding order), shall satisfy the constraints on $t_{r,n}(n)$ and $t_r(n)$ expressed in subclauses A.4.1 through A.4.2 of HEVC Draft 8.

Sixth, after the decoding process for a reference picture set as specified in subclause 8.3.2 of HEVC Draft 8 has been invoked, the number of decoded pictures in the DPB, including all pictures marked as "used for reference" and all pictures n that have PicOutputFlag equal to 1 and $t_r(n) < t_r(currPic)$ and $t_{o,dpb}(n) >= t_r(currPic)$, where currPic is the current picture, but not including the current picture, with TemporalId lower than or equal to the TemporalId of the current picture, shall be less than or equal to Min(0, sps_max_dec_pic_buffering[TemporalId]−1). Seventh, all reference pictures shall be present in the DPB when needed for prediction. Each picture shall be present in the DPB at its DPB output time unless it is removed from the DPB before its output time by one of the processes specified in subclause C.3 of HEVC Draft 8.

Eighth, the value of maxPicOrderCnt−minPicOrderCnt shall be less than MaxPicOrderCntLsb/2. Ninth, the value of $\Delta_{to,dpb}(n)$ as given by Equation C-17 of HEVC Draft 8, which is the difference between the output time of a picture and that of the first picture following it in output order and having pic_output_flag equal to 1, shall satisfy the constraint expressed in subclause A.4.1 of HEVC Draft 8 for the profile, tier and level specified in the bitstream using the decoding process specified in clauses 2-9 of HEVC Draft 8. Tenth, when sub_pic_cpb_params_present_flag is 1, the following relationship shall apply: cpb_removal_delay*$t_c$==$t_{c\_sub}$*Σ(du_cpb_removal_minus1$_k$[i]+1) where i=0, . . . , num_decoding_units_minus1.

Eleventh, the variable $T_{du}(k)$ is derived as: $T_{du}(k)=T_{du}(k-1)+t_{c\_sub}$*Σ(du_cpb_removal_minus1$_k$[i]+1), where i=0, . . . , num_decoding_units_minus1$_k$, and where du_cpb_removal_delay_minus1$_k$[i] and num_decoding_units_minus1$_k$ are the corresponding parameters for i-th decoding unit of k'th access unit (with k=0 for the access unit that initialized the HRD and $T_{du}(k)$=0 for k<1). When sub_pic_cpb_params_present_flag is 1, then (au_cpb_removal_delay_minus1+1)*$t_c$==$T_{du}(k)$, where au_cpb_removal_delay_minus1 corresponds to the k-th access unit, maybe true.

Figure 4:
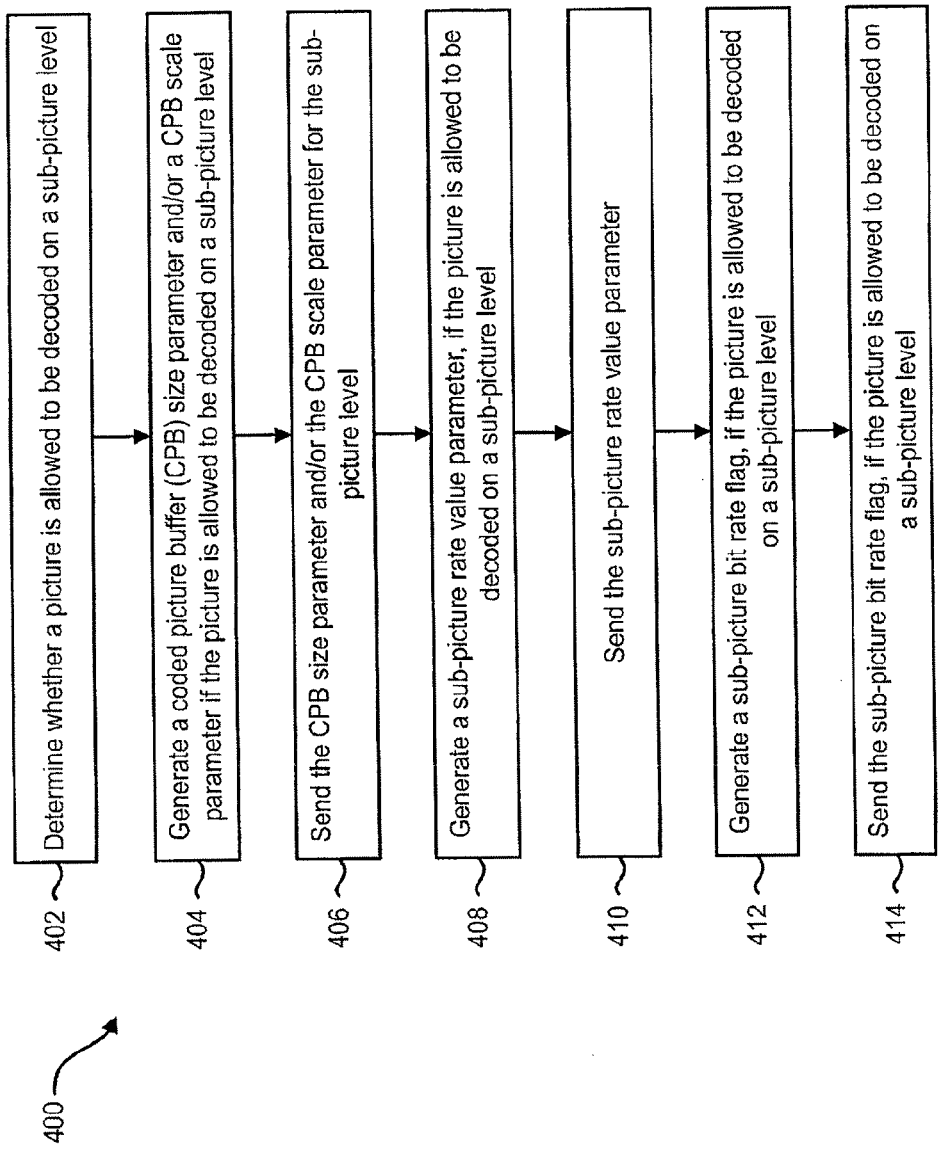
FIG. 4 is a flow diagram illustrating another more specific configuration of a method for sending a sub-picture buffer parameter.

FIG. 4 is a flow diagram illustrating another more specific configuration of a method 400 for sending a sub-picture buffer parameter. An electronic device 102 (e.g., electronic device A 102a) may determine 402 whether a picture is allowed to be decoded on a sub-picture level and, in some instances, whether the picture is allowed to be decoded on a picture level. This may be accomplished as described in connection with FIGS. 2-3 above.

The electronic device 102 may generate 404a CPB size parameter and/or a CPB scale parameter if the picture is allowed to be decoded on a sub-picture level and, in some configurations, in addition to on a picture level. This may be accomplished as described in connection with FIG. 2 above. The CPB size parameter may be a sub-picture CPB size parameter and the CPB scale parameter may be a sub-picture CPB scale parameter.

The electronic device 102 may send 406 the CPB size parameter and/or the CPB scale parameter for the sub-picture level. This may be accomplished as described in connection with FIG. 2 above.

In one configuration, the electronic device 102 may generate 408a sub-picture rate parameter, such as a sub-picture rate value parameter, if it is determined that the picture is allowed to be decoded on a sub-picture level and, in some instances, also on a picture level. The sub-picture rate value parameter may specify the maximum input bit rate for each index value when operating at sub-picture level. The sub-picture rate value parameter may be used in conjunction with the sub-picture bit rate scale parameter, such as du_bit_rate_scale, to specify the maximum bit rate. The sub-picture rate value parameter may be du_bit_rate_value_minus1[SchedSelIdx], as described above in connection with Table 5 above.

The electronic device 102 may send 410 the sub-picture bit rate value parameter. This may be accomplished as described in connection with FIGS. 2-3 above. For example, in some configurations, the sub-picture bit rate scale parameter may be sent, in the bitstream 114 and/or in a separate transmission 110, to electronic device B 102b to assist in decoding encoded pictures at the decoder 112.

It should be noted that the sub-picture level buffer parameters (e.g., du_cpb_size_scale and du_cpb_size_value_minus1[SchedSelIdx]), are sent in addition to the corresponding picture level parameters (e.g., cpb_size_scale and cpb_size_value_minus1[SchedSelIdx]). Also, the sub-picture level buffer parameters, in most instances, differ from corresponding parameters at the picture level. Additionally, it should be noted that these parameters are sent for multiple bit rate values with SchedSelIdx indicating the index for the multiple different bitrate values.

In another configuration, the electronic device 102 may generate 412a sub-picture rate parameter, such as a sub-picture bit rate flag, if it is determined that the picture is allowed to be decoded on a sub-picture level and, in some instances, if it determined that the picture is also allowed to be decoded on a picture level. The HRD may generate and set the sub-picture bit rate flag for each index value corresponding to the CPB at sub-picture level. If the sub-picture bit rate flag is not present, the sub-picture bit rate flag may be inferred to equal to zero. The sub-picture bit rate flag may be du_cbr_flag[SchedSelIdx], as described above in connection with Table 5 above. The sub-picture bit rate flag may be set for each index value in the CPB.

The sub-picture bit rate flag may be generated in addition to the sub-picture rate value parameter. The sub-picture bit rate flag may specify if a hypothetical stream delivery scheduler (HSS) should operate in an intermittent bit rate mode or in constant bit rate (CBR) mode to decode a bitstream 114. For example, the sub-picture bit rate flag may be set to zero to indicate to the HSS to operate in an intermittent bit rate mode to decode a bitstream 114. The sub-picture bit rate flag may be set to one may indicate to the HSS to operate in CBR mode to decode a bitstream 114.

The electronic device 102 may send 414 the sub-picture bit rate flag, if it is determined that the picture is allowed to be decoded on a sub-picture level and, in some instances, if it determined that the picture is also allowed to be decoded on a picture level. This may be accomplished as described in connection with FIGS. 2-3 above. For example, in some configurations, the sub-picture bit rate scale parameter may be sent, in the bitstream 114 and/or in a separate transmission 110, to electronic device B 102b to assist in decoding encoded pictures at the decoder 112.

It should be noted that the sub-picture level buffer parameters (e.g., du_cpb_size_scale and du_cpb_size_value_minus1[SchedSelIdx]), are sent in addition to the corresponding picture level parameters (e.g., cpb_size_scale and cpb_size_value_minus1[SchedSelIdx]). Also, the sub-picture level buffer parameters, in most instances, differ from corresponding parameters at the picture level. Additionally, it should be noted that these parameters are sent for multiple bit rate values with SchedSelIdx indicating the index for the multiple different bitrate values.

Figure 5:
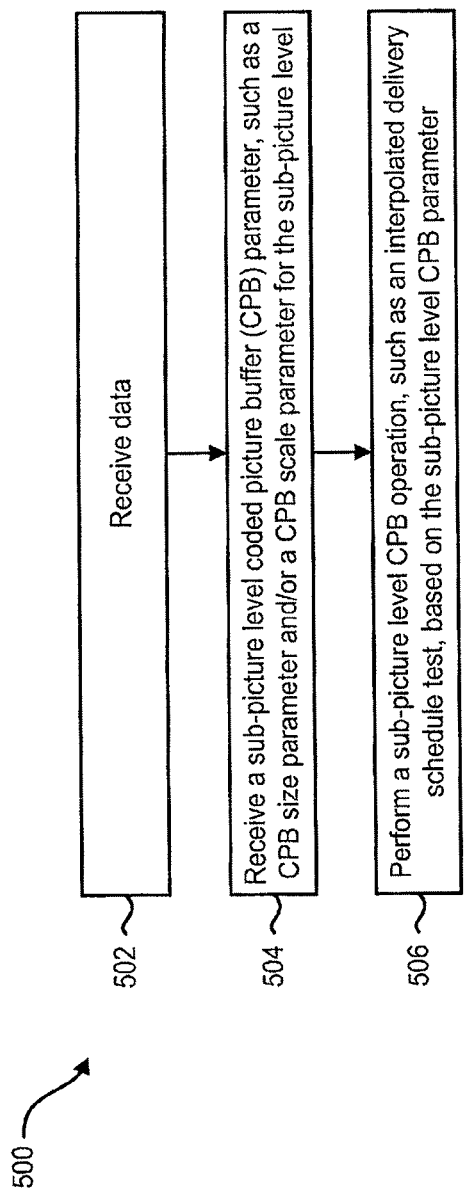
FIG. 5 is a flow diagram illustrating one configuration of a method for receiving a sub-picture buffer parameter.

FIG. 5 is a flow diagram illustrating one configuration of a method 500 for receiving a sub-picture buffer parameter. An electronic device 102 (e.g., electronic device B 102b) may receive 502 data. The data may be encoded picture data, messages such as a buffering period SEI message and/or buffer parameters. For example, the electronic device 102 may receive 502 the data via one or more of wireless transmission, wired transmission, device bus, network, etc. For instance, electronic device B 102b may receive 502 the data from electronic device A 102a. The data may be part of the bitstream 114, for example. In another example, electronic device B 102b may receive the data from electronic device A 102a in a separate transmission 110 (that is not part of the bitstream 114, for example). For instance, one or more buffer parameters may be received using some out-of-band mechanism. In some configurations, the message may include the sub-picture CPB size scale parameter.

The electronic device 102 may obtain 504a sub-picture level coded picture buffer (CPB) parameter, such as a CPB size parameter and/or a CPB scale parameter for the sub-picture level. For example, the sub-picture level CPB parameter may be obtained from the data received as part of the bitstream 114 and/or from data received in as part of a separate transmission 110.

In some configurations, the electronic device 102 may perform 506a sub-picture level CPB operation based on the sub-picture level CPB parameter. In some configurations, the sub-picture level CPB parameter may include data useful to specify operation as per hypothetical reference decoder (HRD). In this configuration, the decoder 112 may operate the CPB 120 as defined by the HRD operation. In other words, the decoder 112 may use the signaled CPB size parameter and/or the CPB scale parameter provided to operate the CPB 120 on the decoder 112 as per operation specified for the HRD. Using the signaled CPB size parameter and/or the CPB scale parameter as per the HRD specification may help to ensure that buffer overflow or buffer underflow will not occur at the CPB 120 at the decoder 112.

Additionally or alternatively, the electronic device 102 may perform a sub-picture level CPB operation, such as an interpolated delivery schedule test for sub-picture level CPB operation, based on the sub-picture level CPB parameter. The interpolated delivery schedule test for sub-picture level CPB operation may be based on the sub-picture level CPB parameter. For example, the electronic device 102 may be a decoder 112 having a decoder under test (DUT). The DUT may perform 506 one or more interpolated delivery schedule tests on a sub-picture level for the CPB 120 based on the sub-picture level CPB parameter. The sub-picture level CPB parameter may be the sub-picture CPB size scale parameter.

The interpolated delivery schedule test may be performed separately for the access unit level CPB operation and for sub-picture level CPB operation. A decoder conforming to HEVC Draft 8 may fulfil the following requirements. A decoder claiming conformance to a specific profile, tier and level may be able to successfully decode all bitstreams that conform to the bitstream conformance requirements specified in subclause C.4 of HEVC Draft 8, in the manner specified in Annex A of HEVC Draft 8, provided that all sequence parameter sets and picture parameter sets referred to in the VCL NAL units, and appropriate buffering period and picture timing SEI messages are conveyed to the decoder, in a timely manner, either in the bitstream (by non-VCL NAL units), or by external means not specified by HEVC Draft 8.

When a bitstream contains syntax elements that have values that are specified as reserved and it is specified that decoders shall ignore the values of the syntax elements or the NAL units containing the syntax elements having the reserved values, and the bitstream is otherwise conforming to HEVC Draft 8, a conforming decoder may decode the bitstream in the same manner as it would decode a conforming bitstream and shall ignore the reserved values of the syntax elements or the NAL units containing the syntax elements as specified.

There may be two types of conformance that can be claimed by a decoder: output timing conformance and output order conformance. To check conformance of a decoder, test bitstreams conforming to the claimed profile, tier and level, as specified by subclause C.4 of HEVC Draft 8 may be delivered by a hypothetical stream scheduler (HSS) both to the HRD and to the decoder under test (DUT). All pictures output by the HRD may also be output by the DUT and, for each picture output by the HRD, the values of all samples that are output by the DUT for the corresponding picture may be equal to the values of the samples output by the HRD.

For output timing decoder conformance, the HSS operates as described above, with delivery schedules selected only from the subset of values of SchedSelIdx for which the bit rate and CPB size are restricted as specified in Annex A of HEVC Draft 8 for the specified profile, tier and level, or with "interpolated" delivery schedules as specified below for which the bit rate and CPB size may be restricted as specified in Annex A of HEVC Draft 8. The same delivery schedule may be used for both the HRD and DUT.

When the HRD parameters and the buffering period SEI messages are present with cpb_cnt_minus1 greater than 0, the decoder may be capable of decoding the bitstream as delivered from the HSS operating using an "interpolated" delivery schedule specified as having peak bit rate r, CPB size c(r), and initial CPB removal delay (f(r)÷r) as follows:

$$\alpha = (r - BitRate[SchedSelIdx-1]) \div (BitRate[SchedSelIdx] - BitRate[SchedSelIdx-1]),$$

$$c(r) = \alpha * CpbSize[SchedSelIdx] + (1-\alpha) * CpbSize[SchedSelIdx-1],$$

$$f(r) = \alpha * InitCpbRemovalDelay[SchedSelIdx] * BitRate[SchedSelIdx] + (1-\alpha) * InitCpbRemovalDelay[SchedSelIdx-1] * BitRate[SchedSelIdx-1]$$

for any SchedSelIdx>0 and r such that BitRate[SchedSelIdx-1]<=r<=BitRate[SchedSelIdx] such that r and c(r) are within the limits as specified in Annex A for the maximum bit rate and buffer size for the specified profile, tier and level.

The above interpolated delivery schedule test may be performed separately for the access unit level CPB operation and for sub-picture level CPB operation. In the case of access unit level test, the CpbSize[SchedSelIdx] may be set as CpbSize[SchedSelIdx]=(cpb_size_value_minus [SchedSelIdx]+1)*2^(4+cpb_size_scale).

In the case of sub-picture level test, the CpbSize[SchedSelIdx] may be set as CpbSize[SchedSelIdx]=(du_cpb_size_value_minus1[SchedSelIdx]+1)*2^(4+du_cpb_size_scale). It should be noted that InitCpbRemovalDelay[SchedSelIdx] can be different from one buffering period to another and may have to be recalculated.

For output timing decoder conformance, an HRD as described above may be used and the timing (relative to the delivery time of the first bit) of picture output may be the same for both HRD and the DUT up to a fixed delay.

For output order decoder conformance, the HSS may deliver the bitstream to the DUT "by demand" from the DUT, meaning the HSS delivers bits (in decoding order) only when the DUT requires more bits to proceed with its processing. It should be noted that this may mean that for this test, the coded picture buffer of the DUT could be as small as the size of the largest access unit.

A modified HRD as described below may be used, and the HSS may deliver the bitstream to the HRD by one of the schedules specified in the bitstream such that the bit rate and CPB size are restricted as specified in Annex A of HEVC Draft 8. The order of pictures output may be the same for both HRD and the DUT.

For output order decoder conformance, the HRD CPB size may be equal to CpbSize[SchedSelIdx] for the selected schedule and the DPB size may be equal to MaxDpbSize. Removal time from the CPB for the HRD may be equal to the final bit arrival time and decoding may be immediate.

The electronic device 102 may provide feedback (not shown) to the encoder 104 based on the results of the interpolated delivery schedule test. For example, feedback may be sent via a feedback link. For instance, the separate transmission 110 may be able to send and receive various parameters, feedback and test results between the encoder 104 and the decoder 112. In this manner, encoder 102 may operate such that it does not violate the buffer size parameter and/or the buffer scale parameter sent to the decoder 112.

Figure 6:
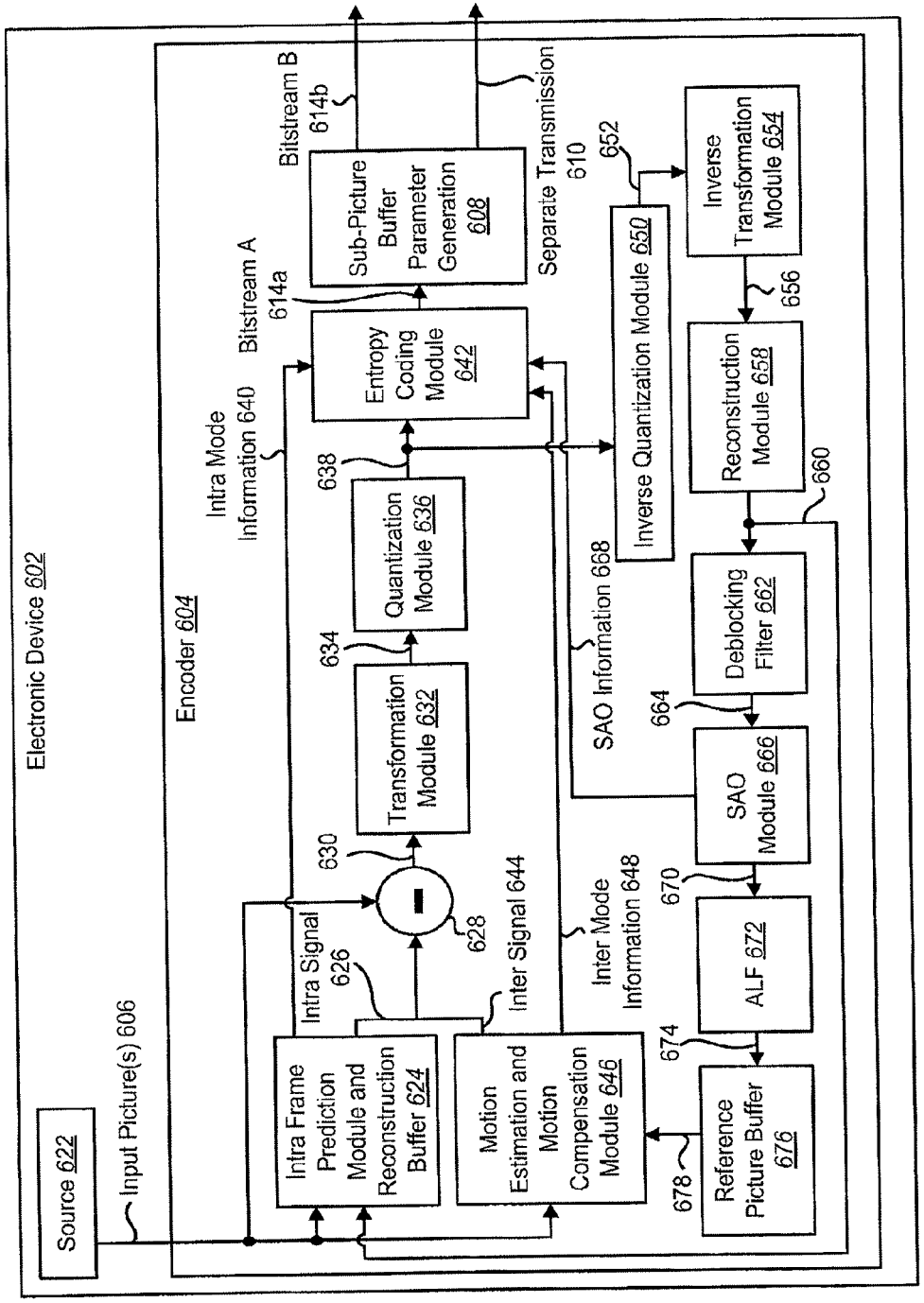
FIG. 6 is a block diagram illustrating one configuration of an encoder on an electronic device.

FIG. 6 is a block diagram illustrating one configuration of an encoder 604 on an electronic device 602. It should be noted that one or more of the elements illustrated as included within the electronic device 602 may be implemented in hardware, software or a combination of both. For example, the electronic device 602 includes an encoder 604, which may be implemented in hardware, software or a combination of both. For instance, the encoder 604 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 604 may be an HEVC coder.

The electronic device 602 may include a source 622. The source 622 may provide picture or image data (e.g., video) as one or more input pictures 606 to the encoder 604. Examples of the source 622 may include image sensors, memory, communication interfaces, network interfaces, wireless receivers, ports, etc.

One or more input pictures 606 may be provided to an intra frame prediction module and reconstruction buffer 624. An input picture 606 may also be provided to a motion estimation and motion compensation module 646 and to a subtraction module 628.

The intra frame prediction module and reconstruction buffer 624 may generate intra mode information 640 and an intra signal 626 based on one or more input pictures 606 and reconstructed data 660. The motion estimation and motion compensation module 646 may generate inter mode information 648 and an inter signal 644 based on one or more input pictures 606 and a reference picture buffer 676 signal 678. In some configurations, the reference picture buffer 676 may include data from one or more reference pictures in the reference picture buffer 676.

The encoder 604 may select between the intra signal 626 and the inter signal 644 in accordance with a mode. The intra signal 626 may be used in order to exploit spatial characteristics within a picture in an intra coding mode. The inter signal 644 may be used in order to exploit temporal characteristics between pictures in an inter coding mode. While in the intra coding mode, the intra signal 626 may be provided to the subtraction module 628 and the intra mode information 640 may be provided to an entropy coding module 642. While in the inter coding mode, the inter signal 644 may be provided to the subtraction module 628 and the inter mode information 648 may be provided to the entropy coding module 642.

Either the intra signal 626 or the inter signal 644 (depending on the mode) is subtracted from an input picture 606 at the subtraction module 628 in order to produce a prediction residual 630. The prediction residual 630 is provided to a transformation module 632. The transformation module 632 may compress the prediction residual 630 to produce a transformed signal 634 that is provided to a quantization module 636. The quantization module 636 quantizes the transformed signal 634 to produce transformed and quantized coefficients (TQCs) 638.

The TQCs 638 are provided to an entropy coding module 642 and an inverse quantization module 650. The inverse quantization module 650 performs inverse quantization on the TQCs 638 to produce an inverse quantized signal 652 that is provided to an inverse transformation module 654. The inverse transformation module 654 decompresses the inverse quantized signal 652 to produce a decompressed signal 656 that is provided to a reconstruction module 658.

The reconstruction module 658 may produce reconstructed data 660 based on the decompressed signal 656. For example, the reconstruction module 658 may reconstruct (modified) pictures. The reconstructed data 660 may be provided to a deblocking filter 662 and to the intra prediction module and reconstruction buffer 624. The deblocking filter 662 may produce a filtered signal 664 based on the reconstructed data 660.

The filtered signal 664 may be provided to a sample adaptive offset (SAO) module 666. The SAO module 666 may produce SAO information 668 that is provided to an entropy coding module 642. In some configurations, an SAO signal 670 is optionally provided to an adaptive loop filter (ALF) 672. In this configuration, the ALF 672 produces an ALF signal 674 that is provided to the reference picture buffer 676. Also, in this configuration, the ALF signal 674 may include data from one or more pictures that may be used as reference pictures.

The entropy coding module 642 may code the TQCs 638 to produce bitstream A 614a (e.g., encoded picture data). For example, the entropy coding module 642 may code the TQCs 638 using Context-Adaptive Variable Length Coding (CAVLC) or Context-Adaptive Binary Arithmetic Coding (CABAC). In particular, the entropy coding module 642 may code the TQCs 638 based on one or more of intra mode information 640, inter mode information 648 and SAO information 668. Bitstream A 614a (e.g., encoded picture data) may be provided to a sub-picture buffer parameter generation module 608. The sub-picture buffer parameter generation module 608 may be configured similarly to the sub-picture buffer parameter generation module 108 described in connection with FIG. 1. Additionally, the sub-picture buffer parameter generation module 608 may perform one or more of the procedures described in connection with FIG. 2, FIG. 3 and/or FIG. 4.

For example, the sub-picture buffer parameter generation module 608 may generate a sub-picture buffer parameter, such as the sub-picture CPB size scale parameter and/or a sub-picture size parameter. In some configurations, the sub-picture buffer parameter may be inserted into bitstream A 614a to produce bitstream B 614b. Thus, the message may be generated after the entire bitstream A 614a is generated (e.g., after most of bitstream B 614b is generated), for example. In other configurations, the sub-picture buffer parameter may not be inserted into bitstream A 614a (in which case bitstream B 614b may be the same as bitstream A 614a), but may be provided in a separate transmission 610.

In some configurations, the electronic device 602 sends the bitstream 614 to another electronic device. For example, the bitstream 614 may be provided to a communication interface, network interface, wireless transmitter, port, etc. For instance, the bitstream 614 may be transmitted to another electronic device via LAN, the Internet, a cellular phone base station, etc. The bitstream 614 may additionally or alternatively be stored in memory or another component on the electronic device 602.

Figure 7:
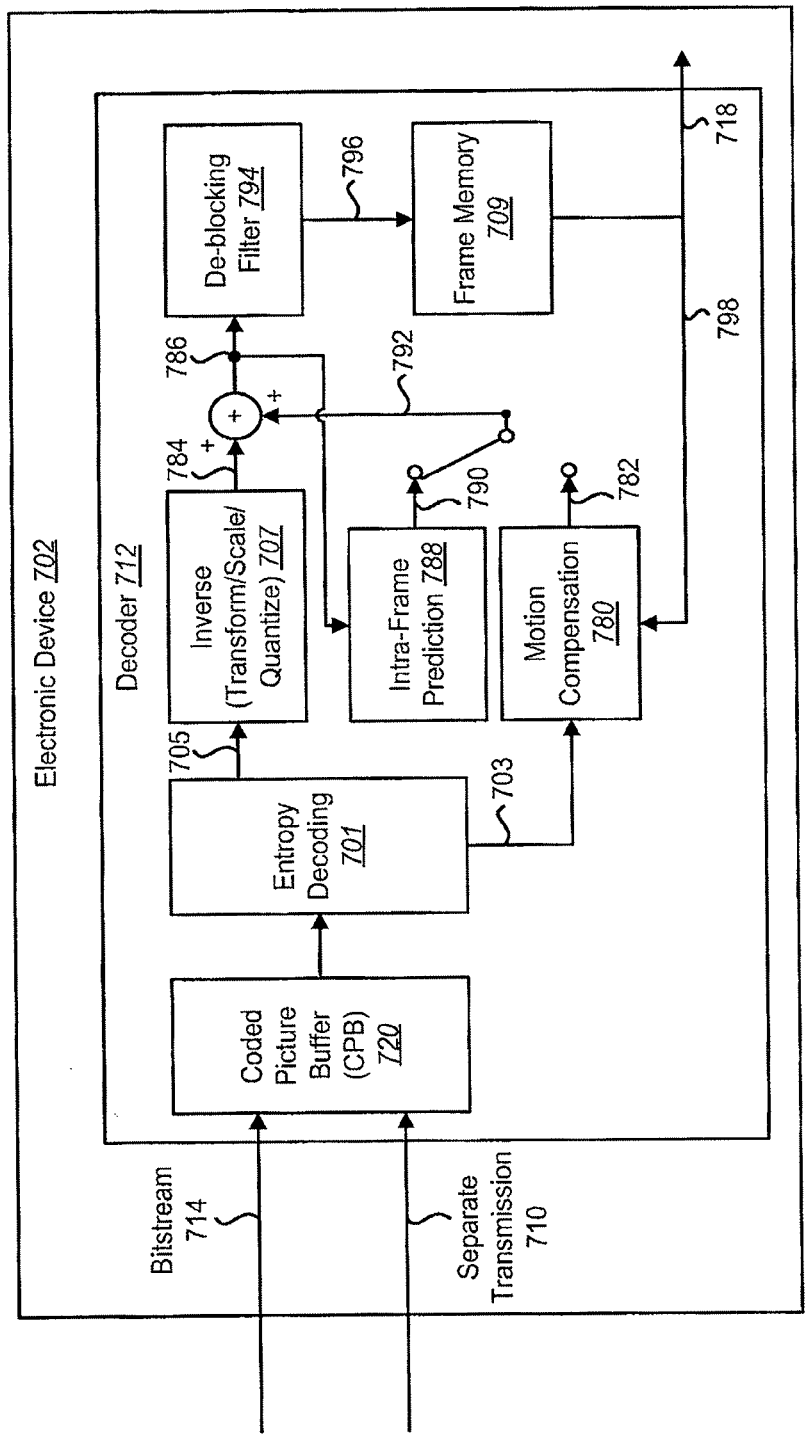
FIG. 7 is a block diagram illustrating one configuration of a decoder on an electronic device.

FIG. 7 is a block diagram illustrating one configuration of a decoder 712 on an electronic device 702. The decoder 712 may be included in an electronic device 702. For example, the decoder 712 may be an HEVC decoder. The decoder 712 and one or more of the elements illustrated as included in the decoder 712 may be implemented in hardware, software or a combination of both. The decoder 712 may receive a bitstream 714 (e.g., one or more encoded pictures and overhead data included in the bitstream 714) for decoding. It should be noted that one or more access units may be included in the bitstream 714 and may include one or more of encoded picture data and overhead data.

In some configurations, the received bitstream 714 may include received overhead data, such as a sub-picture buffer parameter, a message (e.g., buffer period SEI message or other message), slice header, PPS, etc. In some configurations, the decoder 712 may additionally receive a separate transmission 710. The separate transmission 710 may include a sub-picture buffer parameter (e.g., a sub-picture CPB size scale parameter or other buffer parameter). For example, a sub-picture CPB size scale parameter or other buffer parameter may be received in a separate transmission 710 instead of in the bitstream 714. However, it should be noted that the separate transmission 710 may be optional and may not be utilized in some configurations.

The decoder 712 includes a CPB 720. The CPB 720 may be configured similarly to the CPB 120 described in connection with FIG. 1 above. Additionally or alternatively, the decoder 712 may perform one or more of the procedures described in connection with FIG. 5. For example, the decoder 712 may receive a buffer parameter (e.g., a sub-picture CPB size scale parameter or other buffer parameter). Additionally, the decoder 712 may perform an interpolated delivery schedule test for sub-picture level CPB operation. The interpolated delivery schedule test may be based on the sub-picture level CPB parameter. Additionally, the decoder 712 may perform bitstream conformance tests for sub-picture level CPB operation. Furthermore, the decoder 712 may operate the CPB according the specification of hypothetical reference decoder operation specified in HEVC specification, such as defined in HEVC Draft 8.

The Coded Picture Buffer (CPB) 720 may provide encoded picture data to an entropy decoding module 701. The encoded picture data may be entropy decoded by an entropy decoding module 701, thereby producing a motion information signal 703 and quantized, scaled and/or transformed coefficients 705.

The motion information signal 703 may be combined with a portion of a reference frame signal 798 from a frame memory 709 at a motion compensation module 780, which may produce an inter frame prediction signal 782. The quantized, descaled and/or transformed coefficients 705 may be inverse quantized, scaled and inverse transformed by an inverse module 707, thereby producing a decoded residual signal 784. The decoded residual signal 784 may be added to a prediction signal 792 to produce a combined signal 786. The prediction signal 792 may be a signal selected from either the inter frame prediction signal 782 produced by the motion compensation module 780 or an intra frame prediction signal 790 produced by an intra frame prediction module 788. In some configurations, this signal selection may be based on (e.g., controlled by) the bitstream 714.

The intra frame prediction signal 790 may be predicted from previously decoded information from the combined signal 786 (in the current frame, for example). The combined signal 786 may also be filtered by a de-blocking filter 794. The resulting filtered signal 796 may be written to frame memory 709. The resulting filtered signal 796 may include a decoded picture. The frame memory 709 may provide a decoded picture 718.

Figure 8:
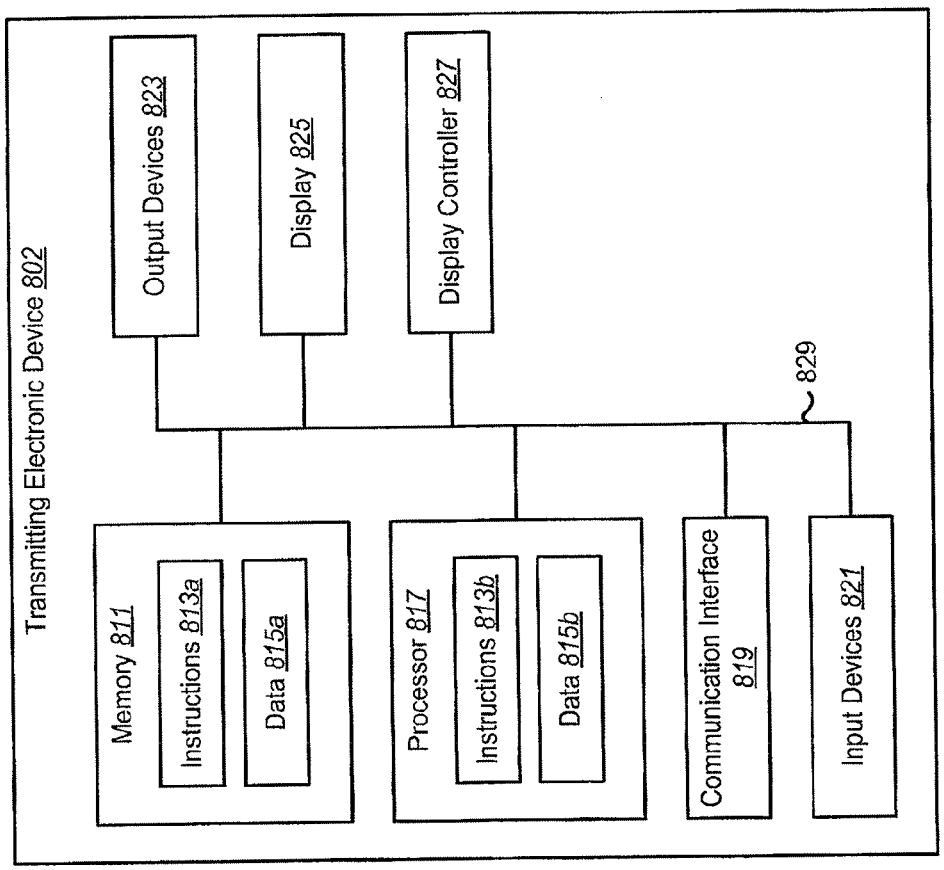
FIG. 8 illustrates various components that may be utilized in a transmitting electronic device.

FIG. 8 illustrates various components that may be utilized in a transmitting electronic device 802. One or more of the electronic devices 102, 602, 702 described herein may be implemented in accordance with the transmitting electronic device 802 illustrated in FIG. 8.

The transmitting electronic device 802 includes a processor 817 that controls operation of the electronic device 802. The processor 817 may also be referred to as a central processing unit (CPU). Memory 811, which may include both read-only memory (ROM), random access memory (RAM) or any type of device that may store information, provides instructions 813a (e.g., executable instructions) and data 815a to the processor 817. A portion of the memory 811 may also include non-volatile random access memory (NVRAM). The memory 811 may be in electronic communication with the processor 817.

Instructions 813b and data 815b may also reside in the processor 817. Instructions 813b and/or data 815b loaded into the processor 817 may also include instructions 813a and/or data 815a from memory 811 that were loaded for execution or processing by the processor 817. The instructions 813b may be executed by the processor 817 to implement the systems and methods disclosed herein. For example, the instructions 813b may be executable to perform one or more of the methods 200, 300, 400, 500 described above.

The transmitting electronic device 802 may include one or more communication interfaces 819 for communicating with other electronic devices (e.g., receiving electronic device). The communication interfaces 819 may be based on wired communication technology, wireless communication technology, or both. Examples of a communication interface 819 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with 3rd Generation Partnership Project (3GPP) specifications and so forth.

The transmitting electronic device 802 may include one or more output devices 823 and one or more input devices 821. Examples of output devices 823 include a speaker, printer, etc. One type of output device that may be included in an electronic device 802 is a display device 825. Display devices 825 used with configurations disclosed herein may utilize any suitable image projection technology, such as a cathode ray tube (CRT), liquid crystal display (LCD), light-emitting diode (LED), gas plasma, electroluminescence or the like. A display controller 827 may be provided for converting data stored in the memory 811 into text, graphics, and/or moving images (as appropriate) shown on the display 825. Examples of input devices 821 include a keyboard, mouse, microphone, remote control device, button, joystick, trackball, touchpad, touchscreen, lightpen, etc.

The various components of the transmitting electronic device 802 are coupled together by a bus system 829, which may include a power bus, a control signal bus and a status signal bus, in addition to a data bus. However, for the sake of clarity, the various buses are illustrated in FIG. 8 as the bus system 829. The transmitting electronic device 802 illustrated in FIG. 8 is a functional block diagram rather than a listing of specific components.

Figure 9:
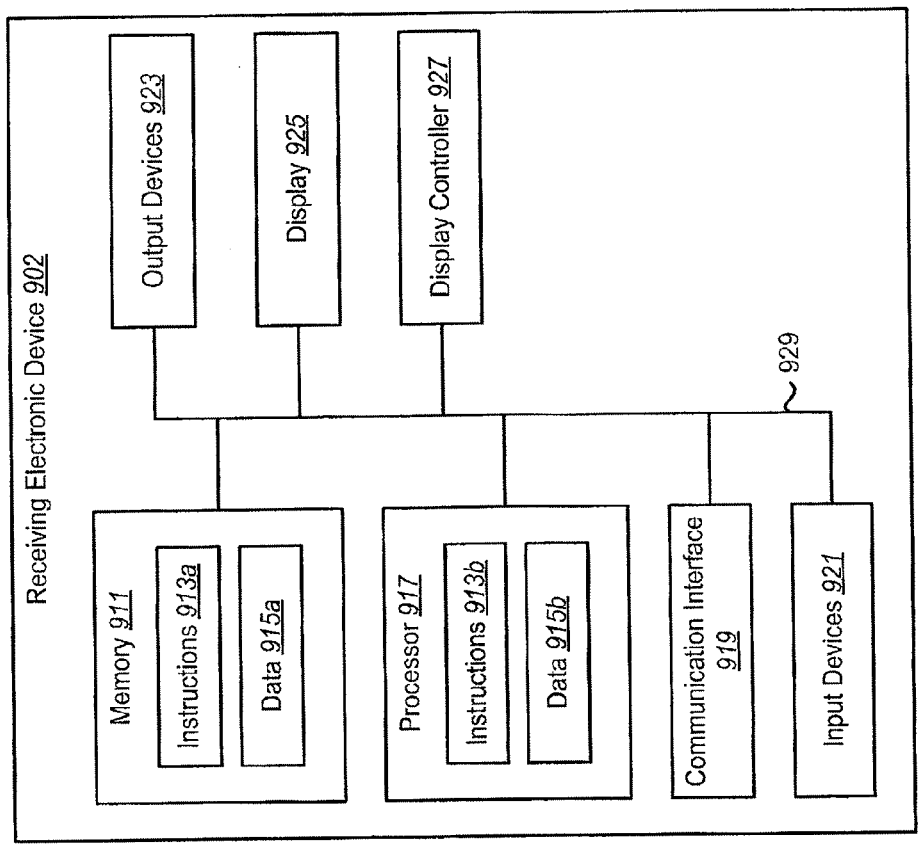
FIG. 9 is a block diagram illustrating various components that may be utilized in a receiving electronic device.

FIG. 9 is a block diagram illustrating various components that may be utilized in a receiving electronic device 902. One or more of the electronic devices 102, 602, 702 described herein may be implemented in accordance with the receiving electronic device 902 illustrated in FIG. 9.

The receiving electronic device 902 includes a processor 917 that controls operation of the electronic device 902. The processor 917 may also be referred to as a CPU. Memory 911, which may include both read-only memory (ROM), random access memory (RAM) or any type of device that may store information, provides instructions 913a (e.g., executable instructions) and data 915a to the processor 917. A portion of the memory 911 may also include non-volatile random access memory (NVRAM). The memory 911 may be in electronic communication with the processor 917.

Instructions 913b and data 915b may also reside in the processor 917. Instructions 913b and/or data 915b loaded into the processor 917 may also include instructions 913a and/or data 915a from memory 911 that were loaded for execution or processing by the processor 917. The instructions 913b may be executed by the processor 917 to implement the systems and methods disclosed herein. For example, the instructions 913b may be executable to perform one or more of the methods 200, 300, 400, 500 described above.

The receiving electronic device 902 may include one or more communication interfaces 919 for communicating with other electronic devices (e.g., a transmitting electronic device). The communication interface 919 may be based on wired communication technology, wireless communication technology, or both. Examples of a communication interface 919 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with 3rd Generation Partnership Project (3GPP) specifications and so forth.

The receiving electronic device 902 may include one or more output devices 923 and one or more input devices 921. Examples of output devices 923 include a speaker, printer, etc. One type of output device that may be included in an electronic device 902 is a display device 925. Display devices 925 used with configurations disclosed herein may utilize any suitable image projection technology, such as a cathode ray tube (CRT), liquid crystal display (LCD), light-emitting diode (LED), gas plasma, electroluminescence or the like. A display controller 927 may be provided for converting data stored in the memory 911 into text, graphics, and/or moving images (as appropriate) shown on the display 925. Examples of input devices 921 include a keyboard, mouse, microphone, remote control device, button, joystick, trackball, touchpad, touchscreen, lightpen, etc.

The various components of the receiving electronic device 902 are coupled together by a bus system 929, which may include a power bus, a control signal bus and a status signal bus, in addition to a data bus. However, for the sake of clarity, the various buses are illustrated in FIG. 9 as the bus system 929. The receiving electronic device 902 illustrated in FIG. 9 is a functional block diagram rather than a listing of specific components.

Figure 10:
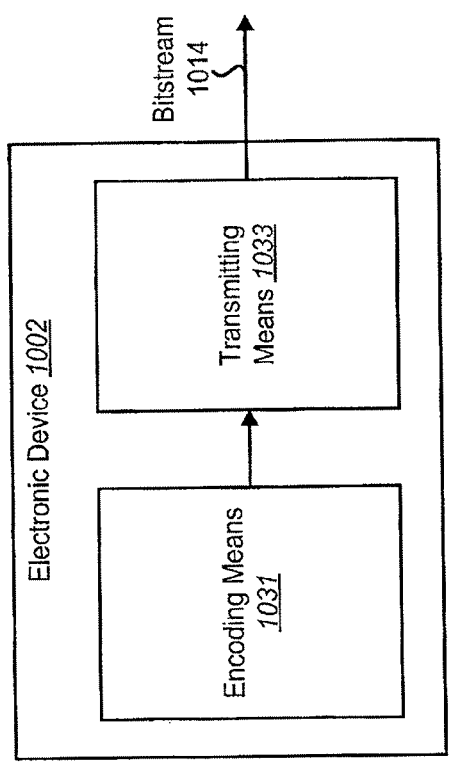
FIG. 10 is a block diagram illustrating one configuration of an electronic device in which systems and methods for sending a sub-picture buffer parameter may be implemented.

FIG. 10 is a block diagram illustrating one configuration of an electronic device 1002 in which systems and methods for sending a message may be implemented. The electronic device 1002 includes encoding means 1031 and transmitting means 1033. The encoding means 1031 and transmitting means 1033 may be configured to perform one or more of the functions described in connection with one or more of FIG. 1, FIG. 2, FIG. 3, FIG. 4, FIG. 6 and FIG. 8 above. For example, the encoding means 1031 and transmitting means 1033 may generate a bitstream 1014. FIG. 8 above illustrates one example of a concrete apparatus structure of FIG. 10. Other various structures may be implemented to realize one or more of the functions of FIG. 1, FIG. 2, FIG. 3, FIG. 4, FIG. 6 and FIG. 8. For example, a DSP may be realized by software.

Figure 11:
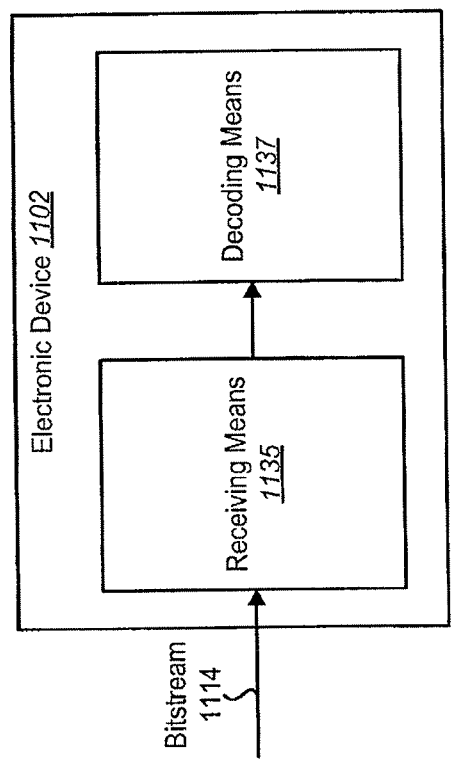
FIG. 11 is a block diagram illustrating one configuration of an electronic device in which systems and methods for receiving a sub-picture buffer parameter may be implemented.

FIG. 11 is a block diagram illustrating one configuration of an electronic device 1102 in which systems and methods for buffering a bitstream 1114 may be implemented. The electronic device 1102 may include receiving means 1135 and decoding means 1137. The receiving means 1135 and decoding means 1137 may be configured to perform one or more of the functions described in connection with one or more of FIG. 1, FIG. 5, FIG. 7 and FIG. 9 above. For example, the receiving means 1135 and decoding means 1137 may receive a bitstream 1114. FIG. 9 above illustrates one example of a concrete apparatus structure of FIG. 11. Other various structures may be implemented to realize one or more functions of FIG. 1, FIG. 5, FIG. 7 and FIG. 9. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an ASIC, a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for encoding a buffer parameter, comprising:
   generating picture level buffer parameters;
   generating a sub-picture coded picture buffer (CPB) parameter present flag, wherein said sub-picture CPB parameter present flag equal to 1 specify that a CPB operates at an access unit level or said sub-picture level;

generating sub-picture level buffer parameters if said picture is allowed to be decoded on said sub-picture level;

specifying a CPB size, wherein
    said CPB size is specified by using said picture level buffer parameters when operating at said access unit level or
    said CPB size is specified by using said sub-picture level buffer parameters when operating at said sub-picture level;

generating a bitstream including said picture level buffer parameters, said sub-picture level buffer parameters and said sub-picture coded picture buffer (CPB) parameter present flag; and sending said bitstream.

2. A computer readable medium storing a program for making a computer encode a buffer parameter, wherein the program making the computer:

generate picture level buffer parameters;

generate a sub-picture coded picture buffer (CPB) parameter present flag, wherein said sub-picture CPB parameter present flag equal to 1 specify that a CPB operates at an access unit level or said sub-picture level;

generate sub-picture level buffer parameters if said picture is allowed to be decoded on said sub-picture level; and specify a CPB size, wherein
        said CPB size is specified by using said picture level buffer parameters when operating at said access unit level or
        said CPB size is specified by using said sub-picture level buffer parameters when operating at said sub-picture level;

generate a bitstream including said picture level buffer parameters, said sub-picture level buffer parameters and said sub-picture coded picture buffer (CPB) parameter present flag; and send said bitstream.

3. A device for encoding a buffer parameter, comprising:

a processor and a memory connected to said processor, wherein said processor configured to perform steps of:

generating picture level buffer parameters;

generating a sub-picture coded picture buffer (CPB) parameter present flag, wherein said sub-picture CPB parameter present flag equal to 1 specify that a CPB operates at an access unit level or said sub-picture level;

generating sub-picture level buffer parameters if said picture is allowed to be decoded on said sub-picture level;

specifying a CPB size, wherein
    said CPB size is specified by using said picture level buffer parameters when operating at said access unit level or
    said CPB size is specified by using said sub-picture level buffer parameters when operating at said sub-picture level;

generating a bitstream including said picture level buffer parameters, said sub-picture level buffer parameters and said sub-picture coded picture buffer (CPB) parameter present flag; and sending said bitstream.

\* \* \* \* \*